US005437050A

United States Patent [19]

Lamb et al.

[11] Patent Number: 5,437,050

[45] Date of Patent: Jul. 25, 1995

[54] METHOD AND APPARATUS FOR RECOGNIZING BROADCAST INFORMATION USING MULTI-FREQUENCY MAGNITUDE DETECTION

[76] Inventors: Robert G. Lamb, 3121 U.S. Highway 64, Apex, N.C. 27502; Andrew M. Economos, 2 Edgemont, Scarsdale, N.Y. 10583; Elliot F. Mazer, 6501 Farallon Way, Oakland, Calif. 94611

[21] Appl. No.: 973,779

[22] Filed: Nov. 9, 1992

[51] Int. Cl.[6] .................... H04H 9/00; H04N 7/00; H04N 17/04; G06F 17/15

[52] U.S. Cl. .................... 455/2; 348/1; 364/487; 382/191; 395/2.16

[58] Field of Search .................... 364/484, 485, 554, 487; 455/2; 358/84; 381/42, 43; 395/2; 382/16, 17, 14, 15, 34, 36; 348/1-5

[56] References Cited

U.S. PATENT DOCUMENTS

| | | | |
|---|---|---|---|
| 2,947,971 | 8/1960 | Glauberman et al. | 382/34 |
| 4,739,398 | 4/1988 | Thomas et al. | 455/2 |
| 4,843,562 | 6/1989 | Kenyon et al. | 358/84 |
| 4,947,436 | 8/1990 | Greaves et al. | 395/2 |
| 5,261,010 | 11/1993 | Lo et al. | 382/34 |

OTHER PUBLICATIONS

Young, Jeffrey, "You're Playing My Song", *Forbes*, Jul. 5, 1993, pp. 114–115.

*Primary Examiner*—Reinhard J. Eisenzopf
*Assistant Examiner*—Mark D. Wisler

[57] ABSTRACT

A method and apparatus for recognizing broadcast information, the method including the steps of receiving a set of broadcast information; converting the set of broadcast information into a frequency representation of the set of broadcast information; dividing the frequency representation into a predetermined number of frequency segments, each frequency segment representing one of the frequency bands associated with the semitones of the music scale; forming an array, wherein the number of elements in the array correspond to the predetermined number of frequency segments, and wherein each frequency segment with a value greater than a threshold value is represented by binary 1 and all other frequency segments are represented by binary 0; comparing the array to a set of reference arrays, each reference array representing a previously identified unit of information; determining, based on the comparison, whether the set of broadcast information is the same as any of the previously identified units of broadcast information.

17 Claims, 11 Drawing Sheets

METHOD AND APPARATUS FOR RECOGNIZING BROADCAST INFORMATION USING MULTI-FREQUENCY MAGNITUDE DETECTION

BACKGROUND OF THE INVENTION

This invention relates to a system adopted for recognizing broadcast information. More particularly, this invention relates to a method and apparatus for determining whether an item of broadcast information corresponds to any of a plurality of items of information previously stored in a reference library.

A wide variety of copyrighted recordings and commercial messages are transmitted by broadcast stations. Copyrighted works such as moving pictures, television programs, and phonographic recordings attract audiences for broadcast stations, and the aforementioned commercial messages, when sent to the audiences, provide revenue for the broadcast stations.

There is an interest among various unions, guilds, performance rights societies, copyright owners, and advertising communities in knowing the type and frequency of information being broadcast. Owners of copyrighted works, for example, may be paid a royalty rate by broadcast stations depending on how often their copyrighted work is broadcast. Similarly, commercial message owners who pay broadcast stations for air time have an interest in knowing how often their commercial messages are broadcast.

It is known in the art that commercial radio and television broadcast stations are regularly monitored to determine the number of times certain information is broadcast. Various monitoring systems have been proposed in the prior art. In manual systems, which entail either real-time listening or delayed listening via video or audio tapes, people are hired to listen to broadcast information and report on the information they hear. Manual systems although simple, are expensive, unreliable, and highly inaccurate.

Electronic monitoring methodologies offer advantages over manual systems such as lower operating costs and reliability. One type of electronic monitoring methodology requires insertion of specific codes into broadcast information before the information is transmitted. The electronic monitoring system can then recognize a song, for example, by matching the received code with a code in a reference library. Such systems suffer from both technical and legal difficulties. For example, such a coding technique requires circuitry, which is expensive to design and assemble and which must be placed at each transmitting and receiving station. Legal difficulties stem from the adverse position of government regulatory agencies toward the alteration of broadcast signals without widespread acceptance thereof by those in the broadcast industry.

A second type of electronic monitoring methodology requires pre-specification of broadcast information into a reference library of the electronic monitoring system before the information can be recognized. A variety of pre-specification methodologies have been proposed in the prior art. The methodologies vary in speed, complexity, and accuracy. Methodologies which provide accuracy are likely to be slow and complex, and methodologies which provide speed are likely to be inaccurate.

Regarding accuracy, for example, there exists a time-bandwidth problem with electronic monitoring systems which divide the received broadcast information into nonoverlapping time segments and perform Fourier or analogous transforms on each segment to arrive at a description of the received broadcast information in frequency space. If the time segments are made long to achieve good resolution of the low frequency components of the broadcast information, the resulting system looses its ability to recognize broadcast information played at a slightly different speed than that used to record the information into the electronic monitoring system reference library. Conversely, if the time segments are made too short in an effort to minimize the above-mentioned deficiency, the information contained in the resulting frequency data is not unique enough to allow the system to distinguish between similar sounds, and hence recognition errors result.

Another problem in the prior art of electronic monitoring is that electronic monitoring systems require advance knowledge of broadcast information. Electronic monitoring systems which rely on the pre-specification of broadcast information are unable to recognize broadcast information not in the electronic monitoring system's reference library. As a consequence, broadcast information is not recognized, and the necessity to enroll unspecified broadcast information into the electronic monitoring system reference library creates a bottleneck that may effectively decrease the accuracy and efficiency of the electronic monitoring system. Thus, in view of the above problems, there exists a need in the electronic monitoring art to develop a broadcast information monitoring system which is both efficient and accurate.

SUMMARY OF THE INVENTION

It is a primary object of the present invention to provide a novel broadcast information monitoring system and method that is excellent in both efficiency and accuracy. The present invention is based in part on the idea that the broadcast information on which recognition is based lies in the narrow frequency bands associated with the semitones of the music scale, rather than in the continuum of audio frequencies or in other sets of discrete frequency bands. Another underlying idea of the present invention is that the set of semitones that have energies above a threshold amount at each instant provide sufficient information for recognition, and that it is not necessary to use the absolute energies of all frequencies for recognition.

In accordance with the above object and ideas, the present invention does not divide broadcast information into time segments. Rather, the present invention performs continual frequency analysis of the broadcast information, and the frequency information is continually sampled at a rate of 50 samples per second for incorporation into a data matrix. The data matrix is used for comparison with reference data matrixes stored in a broadcast information reference library.

It is a more specific object of the present invention to provide a method of recognizing broadcast information, including the steps of receiving broadcast information, the broadcast information being in analogue form and varying with time; converting the broadcast information into a frequency representation of the broadcast information; dividing the frequency representation into a plurality of separate frequency bands; determining a magnitude of each separate frequency band of the digital sample; and storing the magnitudes. The method of recognizing broadcast information also includes the steps of performing a significance determination a plurality of times, the significance determination including the steps of generating a magnitude of each separate frequency band, using a predetermined number of previously stored magnitudes for each respective frequency band; storing the magnitudes; and determining a significance value, using a predetermined number of previously stored magnitudes for each respective frequency band. The method of recognizing broadcast information further includes the steps of comparing the significance value to the most recently generated magnitude of each separate frequency bands generating a data array, the data array having a number of elements equal to the number of separate frequency bands, the values of the elements being either binary 1 or binary 0 depending on the results of the comparison; reading a reference data array, the reference data array having been generated from reference information; comparing the data array to the reference data array; and determining, based on the comparison, whether the broadcast information is the same as the reference information.

Another object of the present invention is to provide a novel digital recording method in conjunction with the monitoring system to achieve recognition of broadcast information pre-specified to the monitoring system. The novel digital recording method can also achieve recognition of broadcast information not previously known to the monitoring system, while preserving a complete record of the entire broadcast period which can be used for further reconciliation and verification of the broadcast information.

More specifically, this object is to provide a method of recording broadcast information, including the steps of receiving a set of broadcast information; recording the set of broadcast information in a compressed, digital form; generating a representation of the set of broadcast information; comparing the representation to a file of representations; making a determination, based on the comparison, of whether the representation corresponds to any representations in the file; upon a determination that the representation corresponds to a representation in the file, recording the broadcast time, duration, and identification of the set of broadcast information that corresponds to the representation; upon a determination that the representation does not correspond to any representations in the file, performing the following steps: (a) performing a screening operation on the representation in order to discern whether the representation should be discarded; (b) upon a determination that the representation should not be discarded, performing the following steps: (c) playing the recorded set of broadcast information which corresponds to the set of broadcast information from which the representation was generated in the presence of a human operator; and (d) making a determination, based on the playing of the recorded set of broadcast information, of whether the representation should be added to the file of representations and whether a recording should be made of the broadcast time, duration, and identification of the set of broadcast information that corresponds to the representation.

These and other objects of the present invention will become apparent from a consideration of the following specification and claims taken in conjunction with the accompanying drawings.

BRIEF DESCRIPTION OF THE DRAWINGS

The advantageous features according to the present invention will be readily understood from the description of the presently preferred exemplary embodiment when taken together with the attached drawings. In the drawings.

DETAILED DESCRIPTION OF THE PRESENTLY PREFERRED EMBODIMENT

While the present invention will be described with reference to an audio broadcast monitoring system (monitoring system), those with skill in the art will appreciate that the teachings of this invention may be utilized in a wide variety of signal recognition environments. For example, the present invention may be utilized with radio, television, data transfer and other systems. Therefore, the appended claims are to be interpreted as covering all such equivalent signal monitoring systems.

Figure 1A:
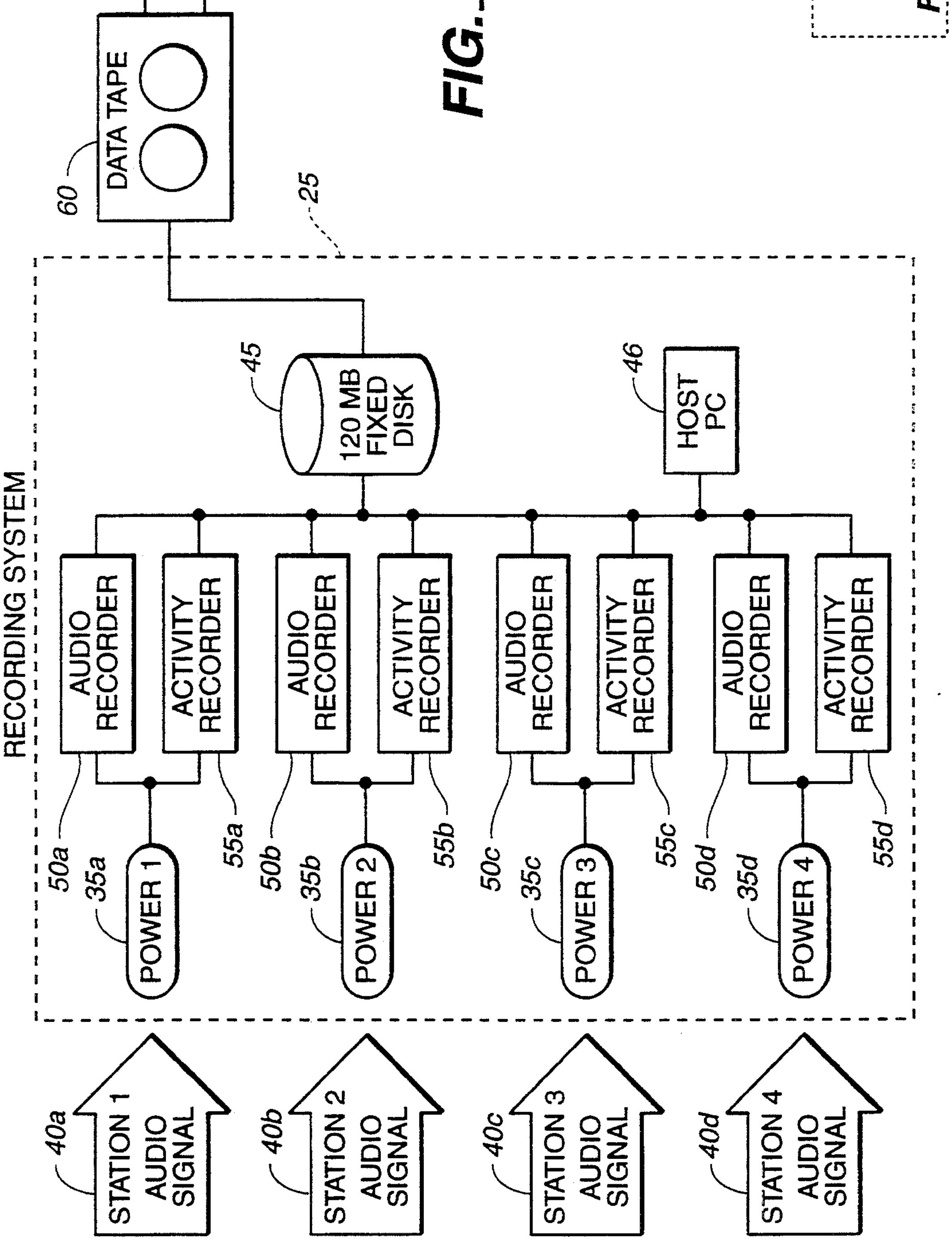
FIG. 1 is a diagram depicting the monitoring system of the preferred embodiment which comprises a recording system and a recognition system.
Figure 1:
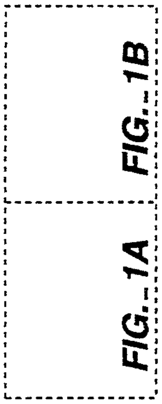
Figure 1B:
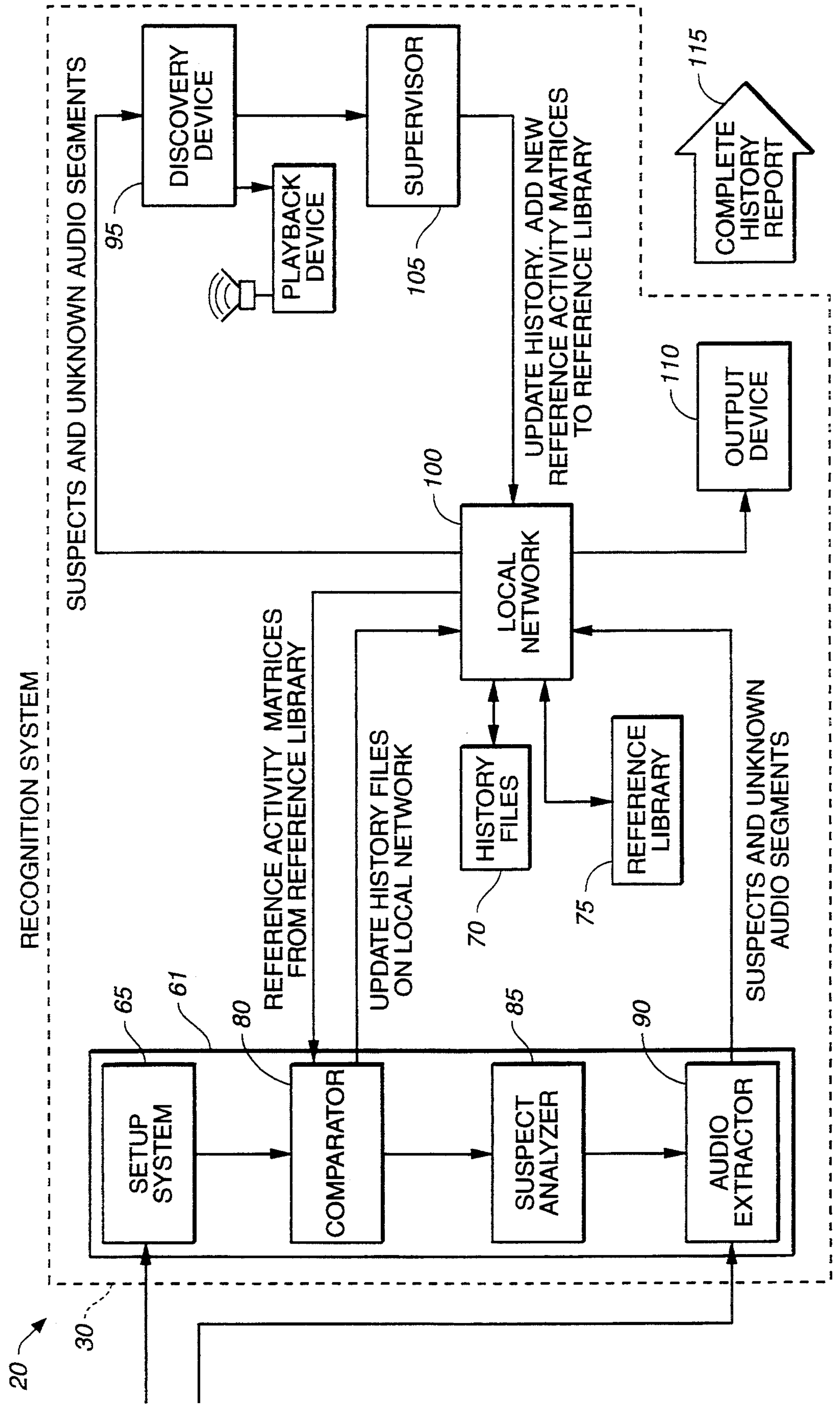

Turning first to FIG. 1, the monitoring system 20 of the presently preferred exemplary embodiment will be described with reference to FIGS. 10–13. The monitoring system 20 comprises a recording system 25 and a recognition system 30. The preferred embodiment has four separate tuners 35*a*, 35*b*, 35*c*, and 35*d*, each tuned to a different broadcast station. Although the preferred embodiment of the present invention incorporates four tuners, the invention is not limited to four tuners, and a larger or smaller number of tuners may be incorporated as desired. According to the preferred embodiment, the four tuners 35*a–d* allow four separate audio signals 40*a*, 40*b*, 40*c*, and 40*d* to enter into the recording system 25 via the four tuners 35*a–d*. This step is shown at 300 in FIG. 10.

The recording system 25 processes the four audio signals 40*a–d* in parallel, and the results of the processed audio signals 40*a–d* are sent to a hard disk 45. As embodied herein, the recording system 25 comprises an IBM PC/AT compatible computer (host PC 46) having one VBX-400 board (containing four audio inputs connected to four digital signal processors) produced by Natural Microsystems; four C25 digital signal processor boards (containing one audio input connected to the digital signal processor) produced by Ariel; and one digital audio tape drive. Each of the four tuners 35*a–d* is connected to the VBX-400 board and a C25 board. The hard disk 45 comprises a 120 MB hard disk drive.

Regarding the parallel processing of the four audio signals 40*a–d*, each of the four audio signals 40*a–d* is fed from one of the four tuners 35*a–d* into one of the four audio recorders 50*a*, 50*b*, 50*c*, and 50*d*, and into one of the four activity recorders 55*a*, 55*b*, 55*c*, and 55*d*. Each of the four audio recorders 50*a–d* comprises a digital signal processor and converts one of the respective four audio signals 40*a–d* into a compressed digital audio stream, hereinafter referred to as digital audio input (that can be played back for humans), as shown at step 305 of FIG. 10. Step 305 also shows the storage of the digital audio input onto the hard disk 45.

Each of the four activity recorders 55*a–d* comprises a C25 digital signal processor and converts one the four audio signals 40*a–d* into a coded form, hereinafter referred to as activity matrix input. The conversion steps are shown at 310 and 335 of FIG. 10 and will be discussed later in greater detail. Step 340 shows the storage of the activity matrix input onto the hard disk The host PC 46 initializes the VBX-400 and C25 boards. This includes transferring special digital signal processor code to each of these boards. The digital signal processor code transferred to the VBX-400 board is "off the shelf" software produced by Natural Microsystems and is responsible for digitizing audio and compressing it. The C25 digital signal processor code is responsible for producing the activity matrix input for each channel.

A user may insert an empty digital audio tape (data tape 60) into the digital audio tape drive. Upon the user's request, the host PC 46 tells the boards to begin processing audio. Each of the C25 DSP boards begins producing a data stream of activity matrix input for its channel. The VBX-400 produces four data streams, one per a channel of digital audio input. Upon filling up on-board buffers, each board signals the host PC 46 that data is available. The host PC 46 reads the available data and appends each data stream to its own hard disk based file located in hard disk 45. As each data stream file reaches approximately 1.44 megabytes in size (or if the user asks to eject a loaded data tape 60, the host PC 46 adds a header to each file (indicating the time covered, channel name, and data type of the file) and closes the file. The host PC 46 then opens a new file for the data stream.

When the number of closed data stream files reach 30% the capacity of the hard disk 45 (or if the user asks to eject the data tape 60, the host PC 46 transfers all closed data stream files to the data tape 60 and deletes these files from the hard disk 45. The host PC 46 also maintains a journal file containing the location and description of each data stream file on the data tape 60. As mentioned above, when the user asks to eject a data tape the host PC 46 flushes all recording data streams to the data tape. This synchronizes all channels of data on the data tape 60 so that the time covered by each channel's data streams on the data tape is identical. The host PC 46 then appends the journal file to the data tape. Finally the host PC 46 ejects the data tape. Upon ejection of the data tape, however, the host PC 46 continues recording data streams to hard disk 45 files. Hopefully the user soon inserts a fresh data tape after ejecting an old one.

The recording system 25 implements all of this in terms of a round-robin, cooperative multi-tasking, object-oriented kernel. The recording system 25 maintains a circular buffer of "task" objects, each of which receives a "run" message as soon as the previous "task" returns from execution of its "run" message. Each task is designed not to execute for more than one second at a time. If a task needs to execute for more than a second, it is derived from a multi-step task class which transfers control to the current task step upon receipt of the "run" message, each step being responsible for indicating the next step to execute. The tasks which form the core of the recording system 25 are as follows:

A. One VBX record task per channel which is responsible for transferring data from the VBX board to a data stream file. When the file fills up it closes the file and opens a new one.

B. One C25 record task per channel which is responsible for transferring the activity matrix input from that C25 board to a data stream file. When the file fills up it closes the file and opens a new one.

C. The data tape service task which accepts messages to load or eject the data tape 60. It also checks to see if the hard disk 45 is beginning to get full; if so, it transfers all closed data stream files to the data tape 60 and clears the files from the hard disk 45. Each of the duties requires many commands to be sent to the digital audio tape drive. The data tape service task sequences these commands and transfers data appropriately.

Figure 10:
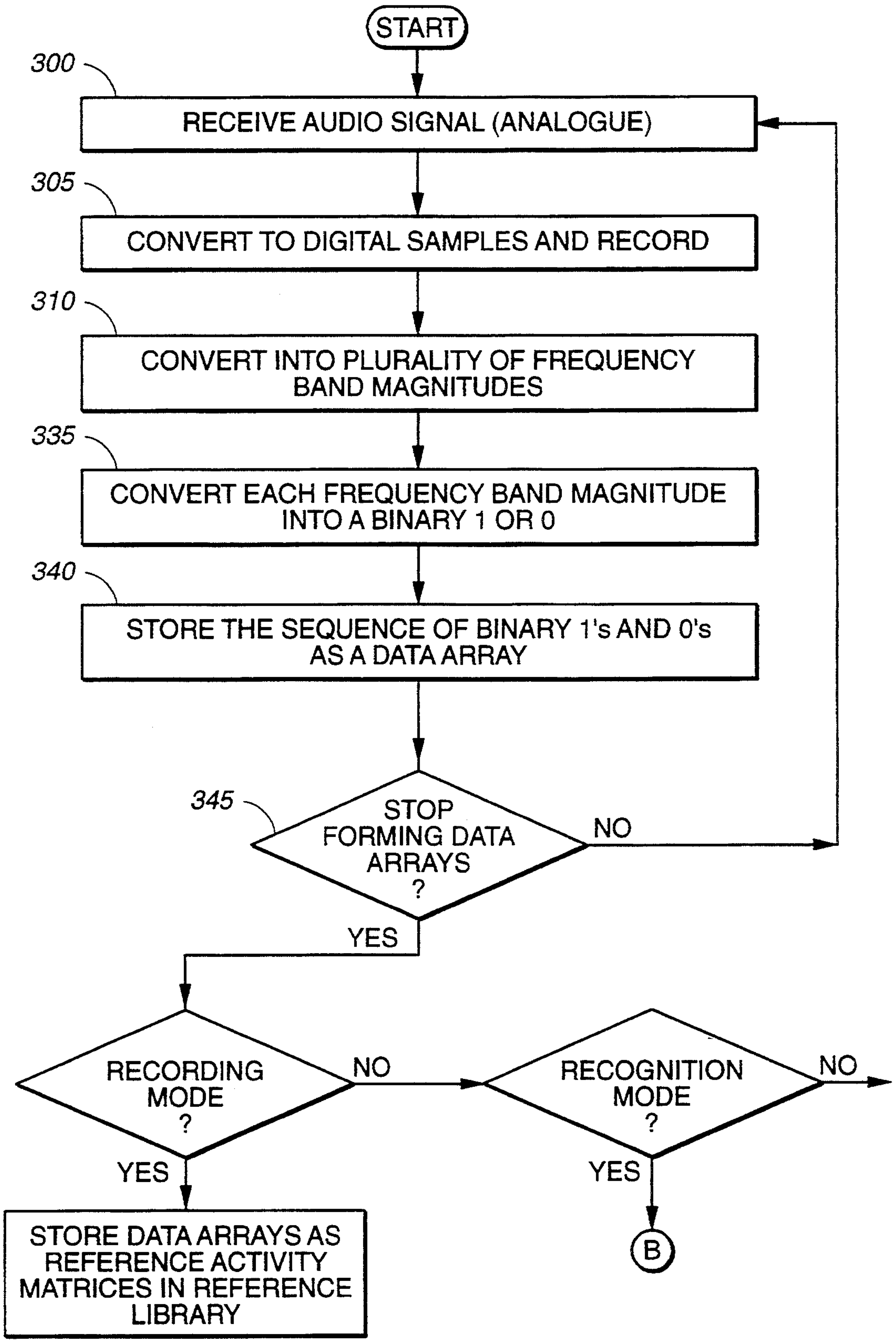
FIG. 10 is a block diagram which illustrates the initial steps of the process of the preferred embodiment.

Step 345 of FIG. 10 shows the step of deciding whether data streams should continue to be formed. Although Step 345 shows a decision block with "yes" and "no" paths, it is noted that the "yes" and "no" paths can both be followed in the case where a data tape 60 is ejected and data streams continue to be processed. Upon completion of a data array, which is added to and becomes a part of the activity matrix input, if a decision is made to continue forming data arrays, the four audio signals 40*a–d* continue to be recorded by the four audio recorders 50*a–d* and by the four activity recorders 55*a–d*, and are buffered onto the hard disk 45, as described above. The digitized audio input and activity matrix input are downloaded from the hard disk 45 onto a data tape 60, as described above, and the data tape 60 is changed at regular intervals. In the preferred embodiment, a data tape 60 is changed once a day on Monday through Friday, and changed a single time for the three day interval of Saturday through Monday.

A data tape 60 is thus transported from the recording system 25 to the recognition system 30 five times per week. Upon arrival, the data tape 60 is loaded into the recognition system 30. Recognition system. 30 comprises, among other elements, super cruncher 61, discovery device 95, and supervisor 105. Using setup system 65, an operator provides the following information to super cruncher 61:

(a) serial numbers of the data tapes to process;

(b) list of stations on the specified data tapes to process;

(c) instructions on which items, such as songs and commercials, in reference library 75 to look for in the activity matrix input for each station (options include look for all items in the library (mass load), and look at the list of items recognized on each station during the last n days and look only for those items plus any new items that have been added to the library since the last analysis of that station was done); and (d) miscellaneous information concerning the disposition of input and output files.

Super cruncher 61 then extracts the activity matrix input from the data tape and reads the reference activity matrices specified by the setup system 65 from the reference library 75. The specified reference activity matrices are read from the reference library 75 at step 350 of FIG. 11. The comparator 80 then analyzes the activity matrix input for matches with the reference activity matrices. Details of the operation of the comparator 80 will be discussed later.

Figure 11:
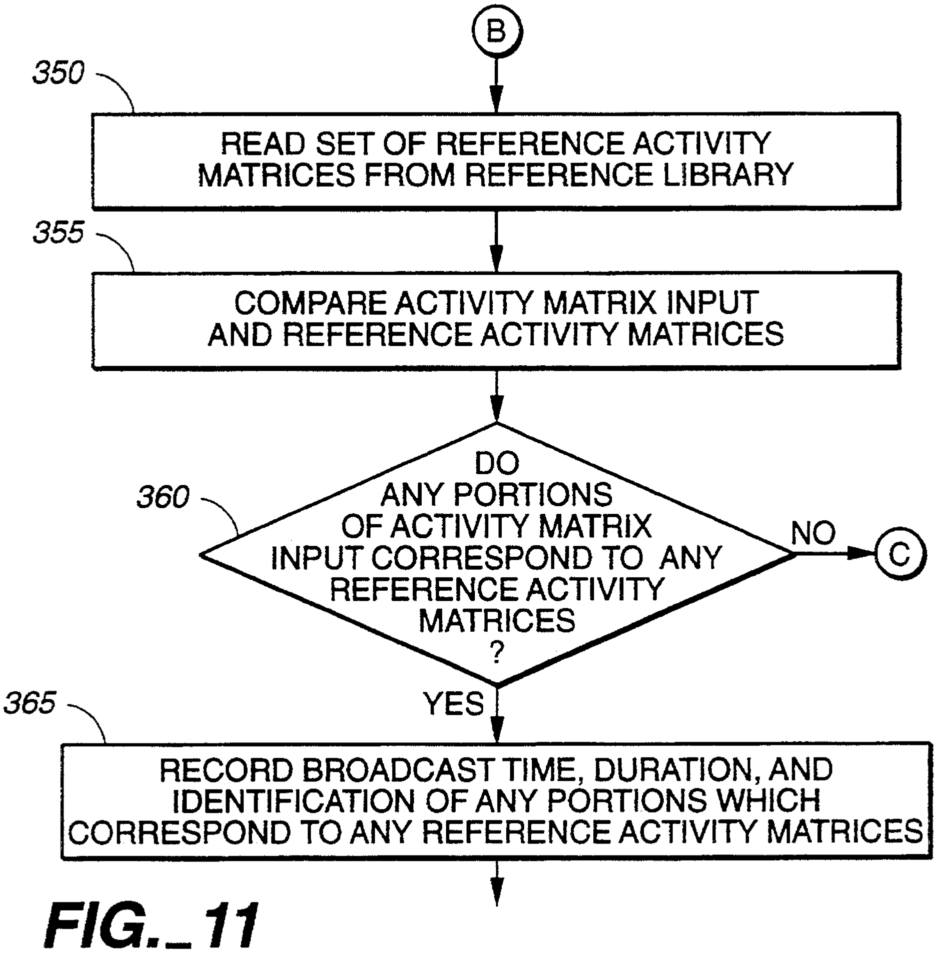
FIG. 11 is a block diagram which illustrates intermediate steps of the process of the preferred embodiment.

Upon comparison of the activity matrix input to the reference activity matrices, shown at step 355 of FIG. 11, a decision is made as to whether any portions of the activity matrix input are sufficiently similar to any reference activity matrices. This decision is shown at step 360 of FIG. 11. For any portions of the activity matrix input which are determined to be sufficiently similar to any reference activity matrices, the history files 70 are updated with the identification of the recognized audio signal (the name of a song, for example) which corresponds 22 to the recognized portion of the activity matrix input, the time at which the recognized audio signal was received into one of the tuners 35*a–d*, and the duration of the recognized audio signal. This step is depicted at 365 of FIG. 15.

An important feature of the present invention is that all of the information needed for both the recognition and coding operations is contained in the activity matrix input. In other words, neither the recognition nor the coding processes requires special information that can be acquired from only the analogue audio signal itself. (Only the digital audio input, however, contains adequate information to reconstruct the actual audio signal with enough fidelity to be intelligible to humans.) This compactness facilitates the "suspect" analysis capability of the present invention which will now be described.

After an audio signal from a radio or TV broadcast, for example, has been analyzed for known items by comparator 80 as described above, there will generally remain unrecognized portions of the audio signal. These portions will most often contain non-prerecorded audio items such as disc jockey chatter, weather reports, news briefs, and the like. However, unrecognized portions will occasionally contain new music or commercials that are not yet in the reference library 75. Many applications of the monitoring system 20 require that such items be identified and added to the reference library 75 as soon as they enter use. The present invention is configured to spot new items by utilizing the fact that the vast majority of music and commercials are broadcast a number of times after they are first introduced. Consequently, if a subportion of a particular unrecognized portion matches a subportion of any other unrecognized portion, that subportion is a "suspect" new commercial or song, for example.

This idea is implemented in the suspect analyzer 85 of the super cruncher 61. Activity matrix input which is not recognized by the comparator 80 is fed to suspect analyzer 85. Suspect analyzer 85 performs a screening operation on unrecognized activity matrix input to determine whether any of the unrecognized activity matrix input contains commercials, music, and/or other prerecorded items that are not currently in the reference library 75. The screening operation, shown in FIG. 12 at 370, will now be described. The first step in the screening operation is the creation of a library of suspect segments. In the preferred embodiment, this is done by starting in the last hour of the activity matrix input that has already been analyzed for known items and examining the unrecognized portions of that hour. To illustrate, suppose that the last hour of activity matrix input contains a single unrecognized interval that extends from 23:10:00 to 23:15:00. This 5-minute period is divided into 100, non-overlapping, 3-sec segments, and a reference activity matrix R[i,m] is extracted for each. The resulting set of 100 reference activity matrices constitutes a library of suspect segments which is not a part of the reference library 75.

Figure 12:
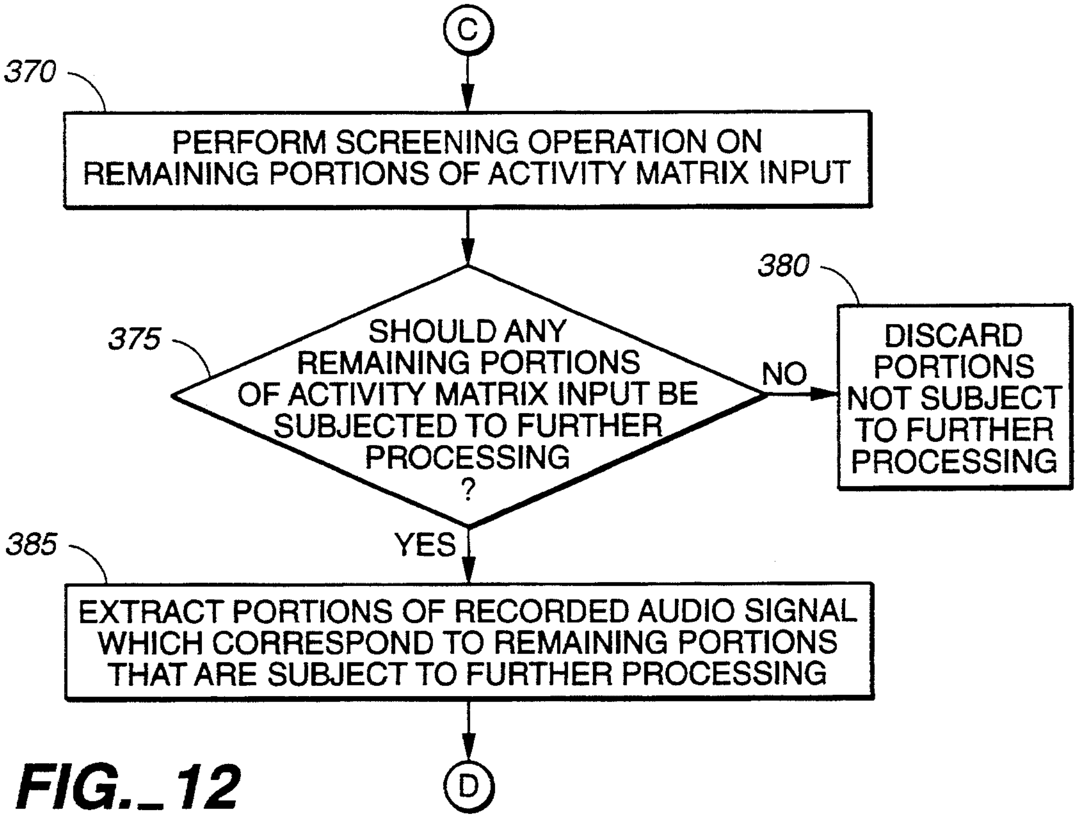
FIG. 12 is a block diagram which illustrates intermediate steps of the process of the preferred embodiment.

Using this library of suspect segments, a recognition analysis similar to that performed by comparator 80 is performed upon unrecognized portions of the activity matrix input in hours prior to hour 23, and/or to unrecognized portions of activity matrix input from other broadcast sources, to determine whether any part of the audio in the given 5-minute interval matches previously unrecognized audio anywhere else. The determination by suspect analyzer 85 of whether a given portion of unrecognized activity matrix input should be subjected to further processing is shown in FIG. 12 at 375. Suppose that a new commercial was broadcast in the 5-minute interval in question, say between 23:11:00 and 23:12:00, and that the same commercial was broadcast earlier. In this case reference matrices 21 through 40 (matrix 1 represents 23:10:00 to 23:10:03, matrix 2 represents 23:10:03 to 23:10:06, etc.) would match audio at the time of the earlier broadcast. Moreover, these matrices would match in sequential order. That is, matrix 22 would match the audio immediately following that matched by matrix 21; matrix 23 would match that immediately following the audio matched by 22; etc. Since the probability is nil that 20 independent items would occur in numerical order by chance, it is safe to assume that reference matrices 21 through 40 represent pieces of a larger item. Accordingly, the time period that these segments span, namely 23:11:00 through 23:12:00, is flagged by the suspect analyzer 85 to be a 1-minute "suspect." The 20 reference matrices for the 1-minute interval are extracted and added to an interim library of quasi-known items (not the suspect segment library and not the reference library 75).

After the 20 reference matrices are added to the interim library of quasi-known items, they are fed to audio extractor 90. Any portions of unrecognized activity matrix input not fed to audio extractor 90 are discarded, as shown at 380 in FIG. 16. Using the digitized audio input downloaded from audio recorders 50*a–d* onto the data tape 60 via hard disk 45 (shown at step 305 of FIG. 10), audio extractor 90 extracts the digital audio input portions which corresponds to each portion of activity matrix input (each reference matrix) fed to the audio extractor 90. This step is shown at 385 of FIG. 12. Audio extractor 90 may be configured to extract portions of digitized audio input corresponding to all or a specified subset of the unrecognized activity matrix input. Continuing with the illustration, audio extractor 90 places the digitized audio input (not the activity matrix input) for the time interval between 23:11:00 and 23:12:00 into a queue for subsequent playback by discovery device 95. In this manner the suspect analysis works its way backward through the unrecognized parts of the audio record, marking suspected new items, adding them to the library of quasi-knowns, and queuing the audio that corresponds to each item. Among the outputs of super cruncher 61, are the following.

(1) A history file which contains a list of all items recognized and their times of occurrence is output. The n-th entry in the history file is of the form {[C(n), S(n)], Tstart(n), Tend(n)} where the pair [C(n), S(n)] identifies the item; Tstart(n) is the time in the broadcast that the item begins; and Tend(n) is the time that it ends. If the n-th item is from the reference library 75, C(n) is the index number of that item in the reference library 75 and S(n)=0. Conversely, if the n-th item is from the temporary library of quasi-knowns, C(n)=0 and S(n) is a number composed of the name of the station in whose record the suspect analysis first found the item and the time of day of that first occurrence. For example, suppose that the n-th item is a 4-minute song that is in the reference library 75 at index position 505, and suppose that on this particular instance the song began at 13:00:00. In this case the history entry would read

{505, 0, 13:00:00, 13:04:00}.

(2) An interim library of quasi-known items which contains suspect segments of all the suspected new music and commercials found in the activity matrix inputs of all the stations processed on each data tape 60 is output. Recall from the description of the history file that each quasi-known item is identified by a number pair of the form [0, S], where S is a number composed of unique information concerning the station on which the suspect was found and the time that it first occurred. If a total of M quasi-known items were found, the interim library of quasi-known items will contain M unique numbers of the form [0, Sm], m=1, . . . , M.

(3) An audio queue containing portions of the digital audio input that correspond to each of the items in the interim library of quasi-known items is output. These digital audio input portions are used in the discovery process, described below, to identify each quasi-known item.

(4) An optional unknown audio file containing portions of the digital audio input that correspond to those portions of activity matrix input that match neither the reference library 75 items nor the library of suspect segments items may be output. These parts of the digital audio input constitute the unrecognized parts of the broadcast. One of the options provided by the discovery process is to playback the unrecognized portions of the broadcast for manual identification.

(5) Digital audio input extracted from the data tapes for each of the stations and year/days processed by the super cruncher 61 is also output.

All outputs produced by super cruncher 61 are fed to discovery device 95 via local network 100. In the library of quasi-knowns each item is identified only by the time that it was broadcast and the broadcast source from which it was taken because its actual identity, such as "Ford Truck commercial" or "Madonna—Like A Prayer", is not yet known. During the discovery process, a user establishes the actual identity of each suspect by listening to the audio played by discovery device 95 which corresponds to that item in the audio queue.

Figure 13:
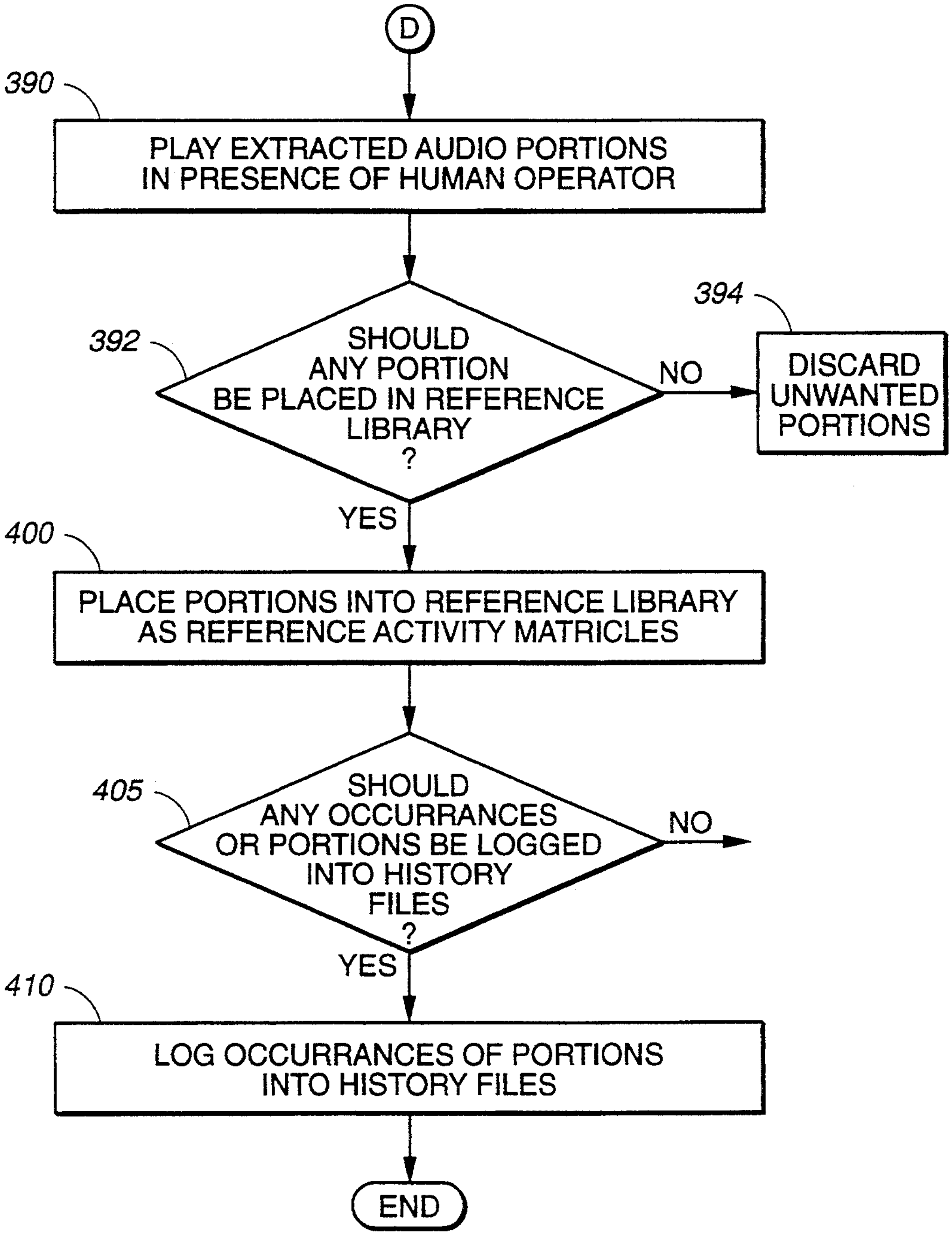
FIG. 13 is a block diagram which illustrates the final steps of the process of the preferred embodiment.

As shown at step 390 of FIG. 13, a human operator at discovery device 95 listens to the extracted digital audio input sent from audio extractor 90 via local network 100. (In the preferred embodiment, audio playback of any portion in the list is achieved simply by moving the cursor to a desired item and hitting a key.) The operator determines whether any of the activity matrix input portions corresponding to any extracted digital audio input portions should be placed in the reference library 75, as shown at 392 of FIG. 13. The activity matrix input portions for the quasi-knowns that the user wishes to place in the reference library 75 are marked and supplementary information, such as song name, artist, commercial product, advertising agency, etc., is provided. The remaining activity matrix input is discarded, as shown at 394 of FIG. 13.

The operator may also play digital audio input portions corresponding to unrecognized activity matrix input (from the optional unknown file) and mark any items to be added to the reference library 75. Moreover, the operator may play digital audio input portions corresponding to activity matrix input that was recognized to confirm that a given item actually occurred at the time that the super cruncher 61 indicated. The discovery device 95 outputs a list of items to be added to the reference library 75. The output list contains the start and end of each marked item, the name of the digital audio input file that contains it, and descriptive information such as song name, commercial product, etc.

The supervisor 105 accepts as input the digital audio input from the super cruncher 61, history files 70 generated by the super cruncher 61, the list of marked items from discovery device 95, and the reference library 75. The supervisor first scans the marked list of items to be added to the reference library 75 and extracts the marked activity matrix input portions. The extracted portions of activity matrix input are then added along with descriptive information to the reference library 75 as reference matrices, as shown in FIG. 13 at 400.

A determination is then made at supervisor 105 of whether the occurrences of any items added to reference library 75 should be logged in history files 70. This determination is shown at 405 of FIG. 13. Upon a determination that the occurrence of a newly added reference activity matrix should be recorded in the history files 70, the history files 70 are updated with the identification of item, the time at which the item was received into one of the tuners 35*a*–*d*, and the duration of the item. This step is shown at 410 of FIG. 13.

The history files 70 generated by the super cruncher 61 are modified to incorporate identities of items that were originally suspects. In this step all suspect identification codes in the history files, i.e., identifications of the form [0, S] are replaced by the "known" identification code [C, 0], where C is the index into the reference library 75 that suspect item S was assigned. If items from the unrecognized portions of the digital audio input were marked for inclusion in the reference library 75, they are added along with their times of occurrence to history files 70.

Written reports are then prepared listing all items recognized and their times of occurrence on all designated broadcast stations. These reports can be tailored to specific formats and information contents as a user may specify. For example, a report may list items by product type or brand name, or demographic information available for the market in which the broadcast was monitored can be combined with the times that specific products or music were broadcast to generate sophisticated marketing information. In the preferred embodiment, the supervisor 105 is adopted to provides a host of other functions which include maintaining the reference library 75, maintaining archives of the history files 70 of all stations, controlling the job lists of the personnel who perform the discovery operations, etc. Written reports on the lists of music and commercials broadcast by each station, including custom statistics and marketing analysis information are output at output device 110.

As shown in FIG. 1, the monitoring system 20 comprises the recording system 25 and the recognition system 30. The recording system 25 and the recognition system 30 perform the two basic operations of the monitoring system 20, which are the recording operation and the recognition operation. The recording operation includes the operation by which the activity recorders 55*a–d* in the recording system 25 transform the four audio signals 40*a–d* into activity matrix input.

The preferred embodiment of an exemplary one of the activity recorders 55*a–d* of the recording system 25 will now be discussed with occasional reference to the above-mentioned FIGS. 10 and 11. The audio signal analysis performed in the recording system 25 spans a 4-octave frequency window. The rate at which the audio data must be sampled and processed to extract the highest frequency component in this window is 16 times that necessary to process the lowest frequency component. Consequently, optimal efficiency of the audio analysis operation can be achieved only by techniques whose process rate is proportional to the frequency of the signal component that they extract. Each of the activity recorders 55*a–d* utilizes a bank of four cascaded smoothers to optimize the frequency analysis operation, as described below.

Figure 2:
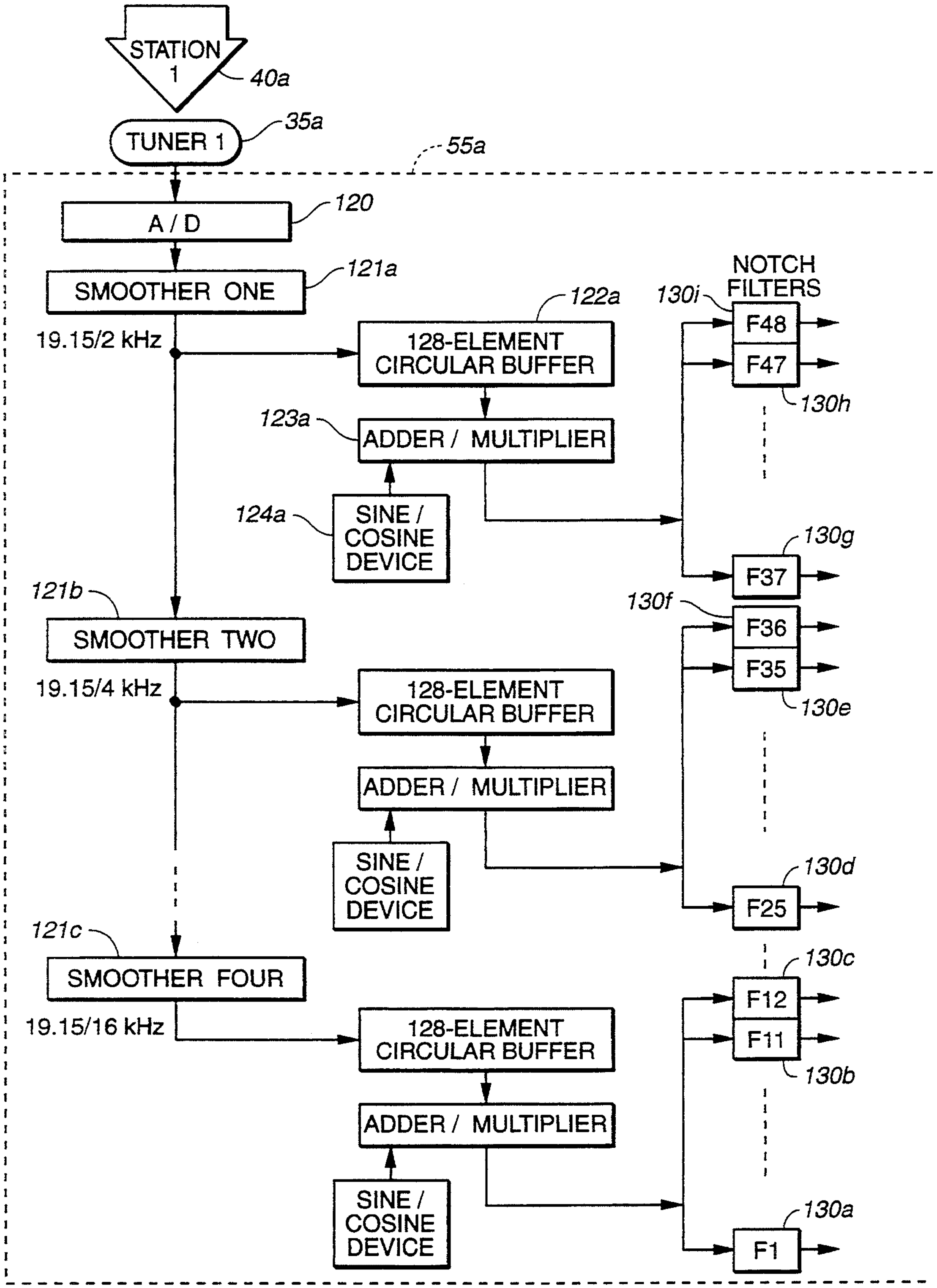
FIG. 2 is a block diagram depicting one channel of the recording system of the preferred embodiment.

Looking at FIG. 2, activity recorder 55*a* is shown having an analogue-to-digital converter 120, which converts input audio signal 40*a* into digital samples as shown at step 305 of FIG. 10. In the preferred embodiment, the audio signal 40*a* is converted from its analogue form into digital samples by the analogue-to-digital converter 120 at a rate of 19,150 samples per second. The four smoothers of activity recorder 55*a* are represented by the first, second, and fourth smoothers depicted in FIG. 2 as 121*a–c.* The exemplary activity recorder 55*a* further comprises 48 notch filters. The 48 notch filters split a processed audio signal into 48 separate frequency bands, as shown at 310 of FIG. 13. The 48 notch filters are represented by the first, eleventh, twelfth, twenty-fifth, thirty-fifth, thirty-sixth, thirty-seventh, forty-seventh, and forty-eighth notch filters depicted in FIG. 2 as 130*a–i,* respectively. Each of the 48 notch filters is tuned to one of the 48 semitones in a 4-octave frequency interval. A semitone is any one of the discrete audio frequencies of the even-tempered music scale. There are 12 semitones per octave with the reference semitone at 440 Hz, which is middle A on the piano. Each of the 48 notch filters passes only the frequency components of the processed audio signal that are within a narrow frequency interval centered at the frequency of which the notch filter is tuned. A graph of the frequency response of the combined 48 notch filters resembles the teeth of a comb, hence the name. The 48 notch filters are implemented using a combination of digital and mathematical techniques, as is known in the art. Each of the 48 notch filters has a bandwidth limit that is tight enough to resolve an individual semitone. For example, the notch filter that detects A-natural passes virtually nothing if tones at either A-flat or A-sharp are input to the notch filter. In the preferred embodiment, the 4-octave interval is set with the upper semitone at approximately 2 kHz and the lower semitone at approximately 2/16 kHz.

Looking at the four smoothers 121*a –c* of FIG. 2, each of the four smoothers takes as input a stream of digital data, say DO. Consider any 4 successive data values d1, d2, d3, and d4 in the DO data stream. The smoother's output value corresponding to d4 is the average of d1, d2, d3, and d4. In other words, for each value dn in the input data stream DO there is a value in the output data stream that is the average of dn and the 3 DO values that immediately proceeded it.

The 4-value averaging operation attenuates frequency components in DO higher than one-half the DO data rate frequency. In effect, the smoother stripe away information about the highest frequency components of the input signal DO, and it passes on information about the low frequency components of DO in its output, say D1. As a consequence, the temporal variations in the D1 data stream are slower than those in DO and hence there is a degree of redundance in any two successive D1 data values.

In the embodiment of FIG. 2, the input to each smoother is the output of the smoother before it. The input data stream for the first smoother is the output of the analogue-to-digital converter 120, which is generating data at the rate of 19.15 kHz. The output of the first smoother 121*a* contains frequency components covering the entire 4-octave analysis window and is fed to the 12 notch filters 130*g–i* that extract the 12 semitones in the highest of the 4 octaves. Every other output value from smoother one 121*a* is fed as input to smoother two 121*b*. Thus, the data rate into smoother two 121*b* is kHz. Smoother two 121*b* essentially removes audio frequencies in and above the highest of the four octaves of interest, but leaves frequencies in the third and lower octaves unaffected. Therefore, the output of smoother two 121*b* is fed to the 12 notch filters 130*d–f* that extract the semitones in the next to highest octave, i.e., octave three. Note that these filters 130*d–f* are processed only one-half as often as those 130*g–i* in the highest octave.

Following this logic the output of smoother two 121*b* is fed to smoother three (not shown) at a rate of samples per sec, and the output of smoother three is used to quantify the second octave. Similarly, smoother four 121*c* provides the lowest octave. The efficiency of this multi-octave analyzer is evident in the rule that is used to control the processing operations. Rather than process every one of the smoothers and 48 notch filters each time a value is generated by the analogue-to-digital converter 120, only two smoothers and 12 notch filters are processed each time the analogue-to-digital converter 120 produces a new value. The particular smoothers and notch filters that are processed on each data cycle are specified by the following algorithm:

Let N denote the data cycle number. N is equivalent to the total number of A/D values generated up to and including the present data cycle. Then, (1) For all data cycles, i.e., for all N, process smoother one 121*a.*

(2) For each data cycle process one additional smoother and 12 notch filters according to the following rule. If (2a) bit 0 (the least significant bit) of N is 1, process smoother two 121*b* and notch filters 130*g–i* (F37 through F48). Processing for this cycle is then complete. Else if (2b) bit 0 of N is 0 and bit 1 of N is 1, process smoother two 121*b* and notch filters 130*d–f* (F25 through F36). Processing for this cycle is then complete. Else if (2c) bit 0 of N is 0 and bit 1 of N is 0 and bit 2 of N is 1, process smoother three and notch filters F13 through F24 (not shown). Processing for this cycle is then complete. Else if (2d) bit 0 of N is 0 and bit 1 of N is 0 and bit 2 of N is 0 and bit 3 of N is 1, process smoother four 121*c* and notch filters 130*a–c* (F1 through F12). Processing for this cycle is then complete. Else if (2e) none of the above conditions is satisfied, i.e., if bits 0, 1, 2, and 3 of N are all zero, no processing is required on this cycle (other than that of smoother one 121*a* in step 2).

Data from each smoother is first processed before it is sent to a corresponding set of 12 notch filters. Looking at the output of smoother one 121*a*, for example, the output is routed to a circular buffer 122*a*. After circular buffer 122*a* receives a first data sample from smoother one 121*a*, the first data sample is placed in slot 1 of the circular buffer; the second data sample goes into slot 2; and the 128th data sample is placed in slot 128. The 129th sample is placed in slot 1, overwriting sample 1; sample 130 is placed in slot 2, overwriting sample 2; etc. Thus, the circular buffer always contains the last 128 samples, but no earlier ones, regardless of the number of samples that have been generated.

Considering notch filters F37 through F48 shown in FIG. 2 at 130*g–i*, output from smoother one 121*a* is fed into circular buffer 122*a* at the rate of 19.15/2 kHz. (Note that only one circular buffer serves the 12 notch filters in each of the 4 octaves.) The 128 elements of circular buffer 122*a* are then Discrete Fourier Transformed using adder/multiplier 123*a* and sine/cosine device 124*a*. A Discrete Fourier Transformation is performed at every "tick" (every 1/50th of a second). The Discrete Fourier Transformation process is known in the art and, in the preferred embodiment, involves multiplying all values in the circular buffer by sine and cosine functions and adding the products to obtain the magnitude of the output.

Since circular buffer 122*a* holds the last 128 samples, the time period spanned by the circular buffer data is 128*2/19150=0.0134 sec. Thus, at each tick when the notch filter outputs are computed, the outputs of filters 130*g–i* (F37 through F48) represent average values over the last 0.0134 seconds. Similarly, the outputs of F25 through F36 represent averages over a period twice this long; F13 through F24 represent averages over four times this period; and F1 through F12 represent averages over 8*0.0134=0.107 sec.

Figure 3:
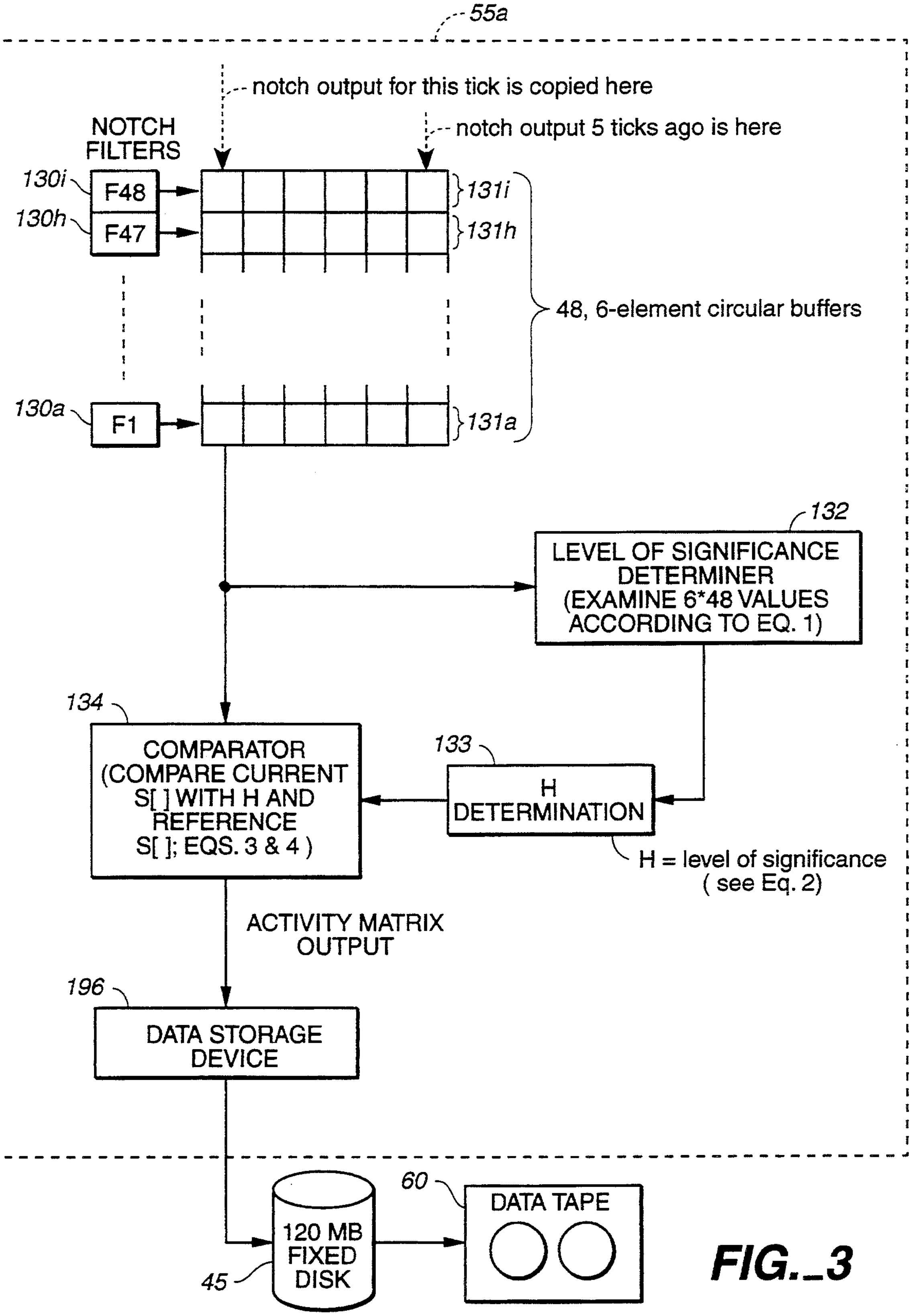
FIG. 3 is a block diagram depicting one channel of the recording system of the preferred embodiment.

Turning to FIG. 3, the outputs of each of the 48 notch filters 130*a–i* are copied into a corresponding 6-element circular buffer at each tick. For example, the output of filter F48 is copied to the 6-element circular buffer 131*i*, the output of filter F47 is copied to the 6-element circular buffer 131*h*, and the output of filter F1 is copied to the 6-element circular buffer 131*a*. The values in this stack of 48 6-element circular buffers are processed by the level of significance determiner 132. The level of significance determiner 132 implements Eq. 1 (discussed below) to determine the top 6 values in the stack of 48 6-element buffers. The top 6 values are fed to the H determiner 133, which finds a notch output level of significance H defined by Eqs. 1 and 2 (discussed below). The H value is then fed to comparator 134 and compared with the current notch outputs of each of the filters (these data are at the top of the stack of 48 6-element buffers) and with the reference value for each filter (defined by Eq. 4 below) to determine which of the activity matrix elements for a tick are assigned 1's and which are assigned 0's.

Figure 5:
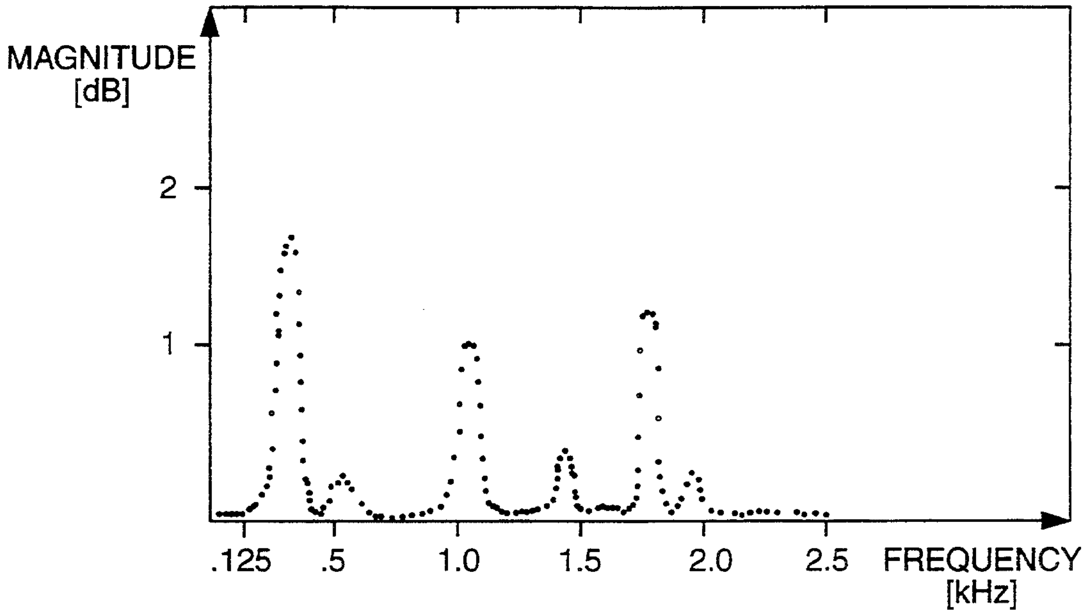
FIG. 5 is an exemplary processed audio waveform after being Discrete Fourier Transformed.
Figure 6:
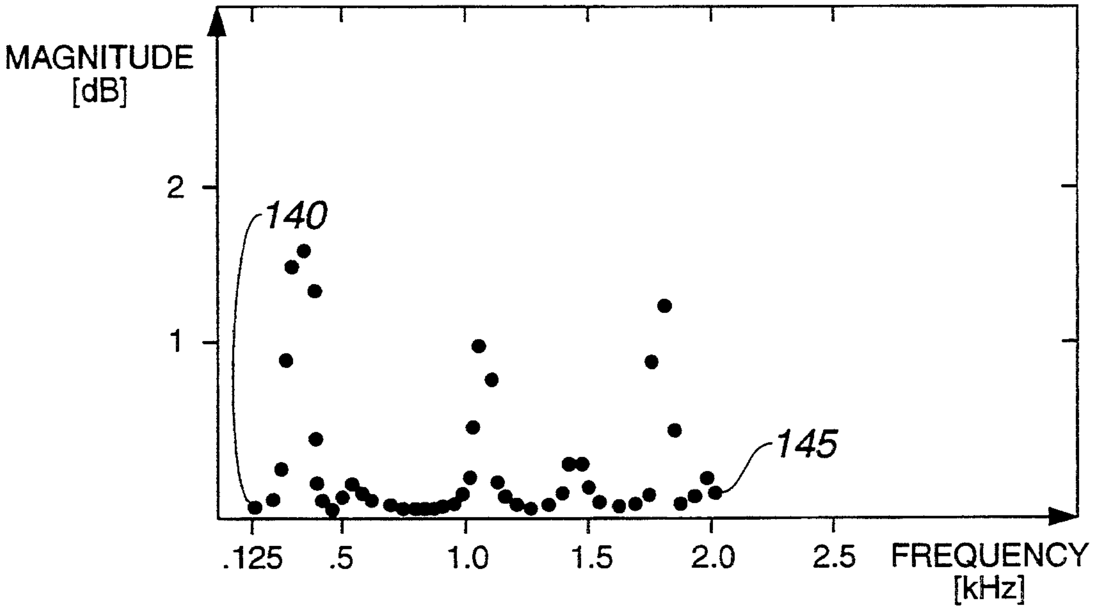
FIG. 6 is the exemplary audio waveform after being divided into forty-eight frequency band magnitudes, each having a separate magnitude.

FIG. 5 shows the form of an exemplary audio signal 40*a* after being digitized, smoothed, buffered, and Discrete Fourier Transformed by the elements of FIG. 2. In other words, FIG. 5 shows an exemplary waveform at the inputs of the 48 notch filters. FIG. 6 shows the outputs of the notch filters. The smoothing, buffering, Discrete Fourier Transforming, and notch filtering of exemplary audio signal 40*a* are shown at 310 of FIG. 10. FIG. 6 also shows that the 48 notch filters produce frequency band magnitudes only over the 4-octave frequency interval between 2/16 kHz and 2 kHz. The frequency band magnitude of the first notch filter 130*a* is shown at 140 in FIG. 6, and the frequency band magnitude of the forty-eighth notch filter 130*i* is shown at 145 in FIG. 6.

Figure 9:
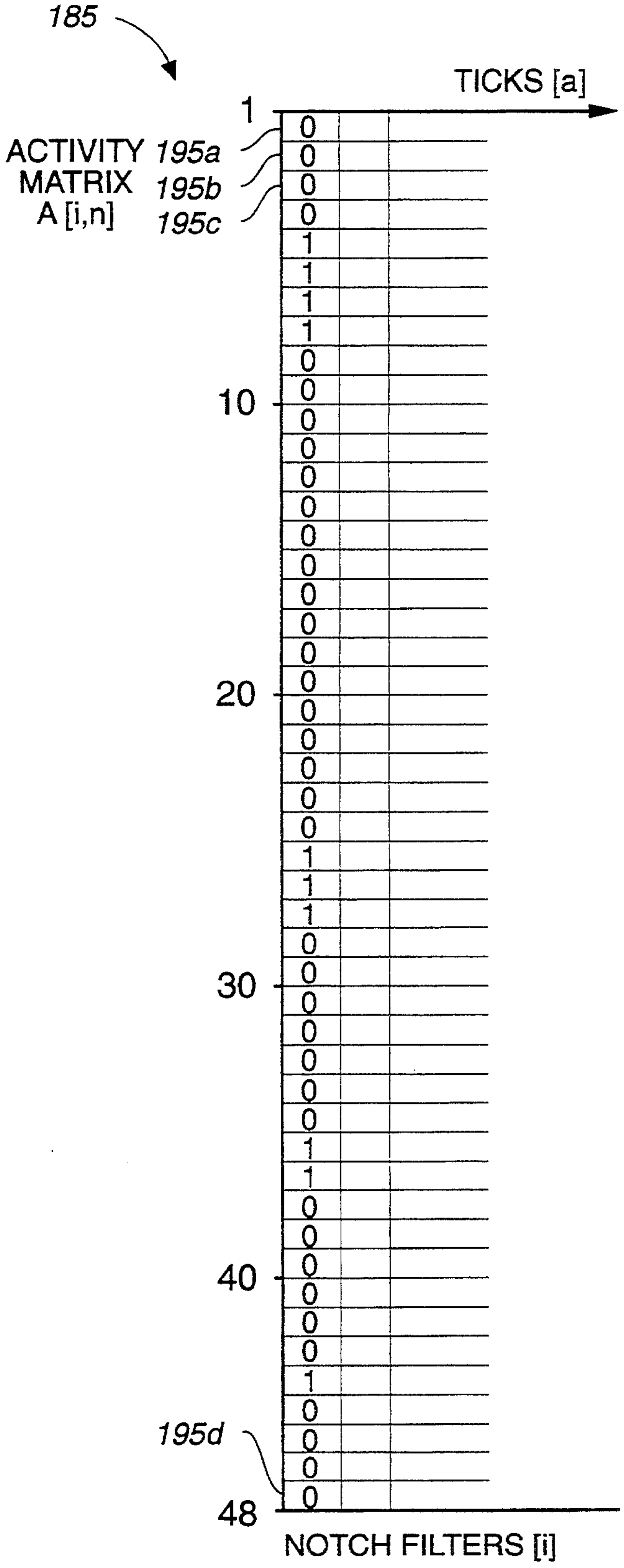
FIG. 9 is a diagram showing the placement of the points of FIG. 8 into the activity matrix of the preferred embodiment.

As discussed above, the output of each notch filter at any given tick represents an average of the 128 values stored in a given circular buffer at that tick. Let Tn denote the time at the n-th tick. For each n, n=1,2, . . . , the average magnitude of each of the 48 semitones is given by the 48 notch filters as S[i,Tn], i=1,2, . . . 48. Recall that the time interval between any two successive ticks, say T1 and T2, is 1/50 second. For each tick Tn, n=1,2, . . . , a new column of an activity matrix A[i,n], shown in FIG. 9 at 185, is generated by comparator 134. The comparator 134 generates 48 outputs, each of which is placed into a corresponding row of the activity matrix A[i,n] 185 to form a column. FIG. 9 shows the first, second, third, and forty-eighth rows of activity matrix A[i,n] 185 at 195*a*, 195*b*, 195*c*, and 195*d*, respectively. A column of activity matrix A[i,n] 185 is generated using the following procedure.

(a) Let M1[n] be the largest value of S over all 48 semitones over the last 6 ticks ending at tick n, i.e., $$M1[n]=\max\{S[i,m]\} \quad \text{Eq. 1}$$

i=1, . . . 48;

m=n, n-1, n-2, n-3, n-4, n-5.

(Note that the max is over 6*48=288 S-values). Similarly, let M2[n] denote the second largest value of the set of 288 values; M3[n] the third largest value, etc.

(b) Ignoring the top two values, since their magnitudes are most sensitive to sampling fluctuations, a threshold of significance H[n] at tick n is defined as follows:

$$H[n]=(M3[n]+M4[n]+M5[n]+M6[n])/8 \quad \text{Eq. 2}$$

(c) At each tick a distinction between active and inactive semitones is made. By definition all semitones are inactive initially. Semitone i becomes active at tick n if (1) it was inactive at tick n-1 and (2) it satisfies the following criterion:

$$S[i,n]>H[n] \quad \text{Eq. 3}$$

If semitone i became active at tick n, it retains the active status for ticks m>n and for as long as its energy level satisfies the following criterion:

$$S[i,m]>S[i,n]/4 \quad \text{Eq. 4}$$

The criterion of Eq. 4 is significant for the recognition operation because when Eq. 3 is the sole qualification for active status, active semitones may unnecessarily lose their active status when other semitones become active. If semitone i last became active at tick n, it becomes inactive at the first tick m, m>n, for which condition Eq. 4 fails; and it retains the inactive status until the condition of Eq. 3 is once again satisfied.

(d) The status of each semitone is represented at each tick by the activity matrix A[i,n] 185, defined as follows:

1, if semitone i is active at tick n; A[i,n]=0, if semitone i is inactive at tick n. Eq. 5

The comparator 134 of FIG. 3 performs the threshold of significance determinations and determines whether 1's or 0's should be placed in the respective rows of activity matrix A[i,n] 185.

Figure 7:
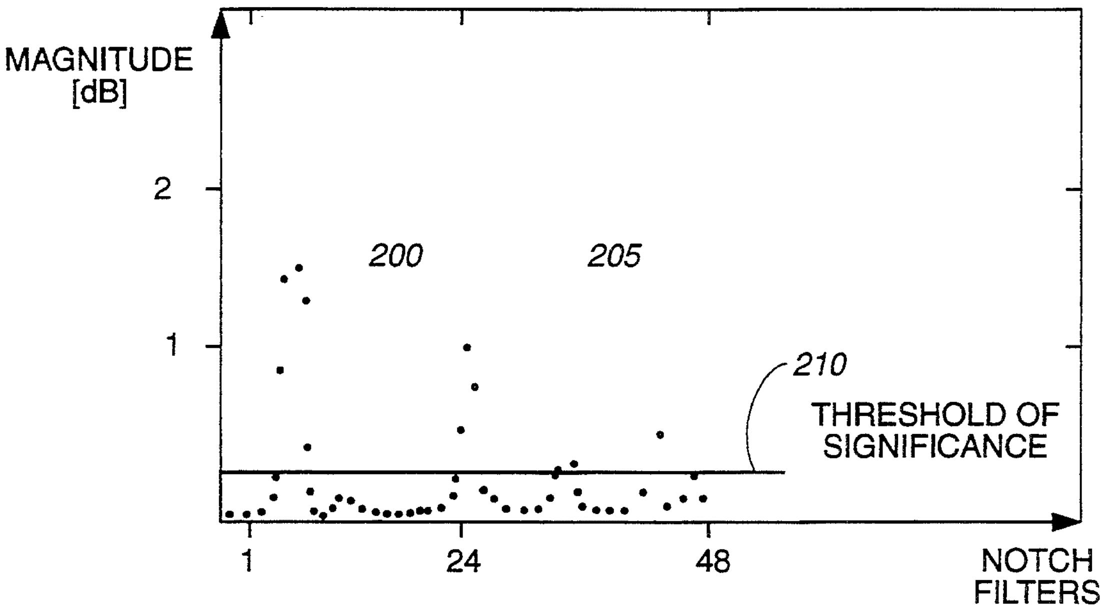
FIG. 7 shows the forty-eight frequency band magnitudes of FIG. 6 and a calculated threshold of significance value.
Figure 8:
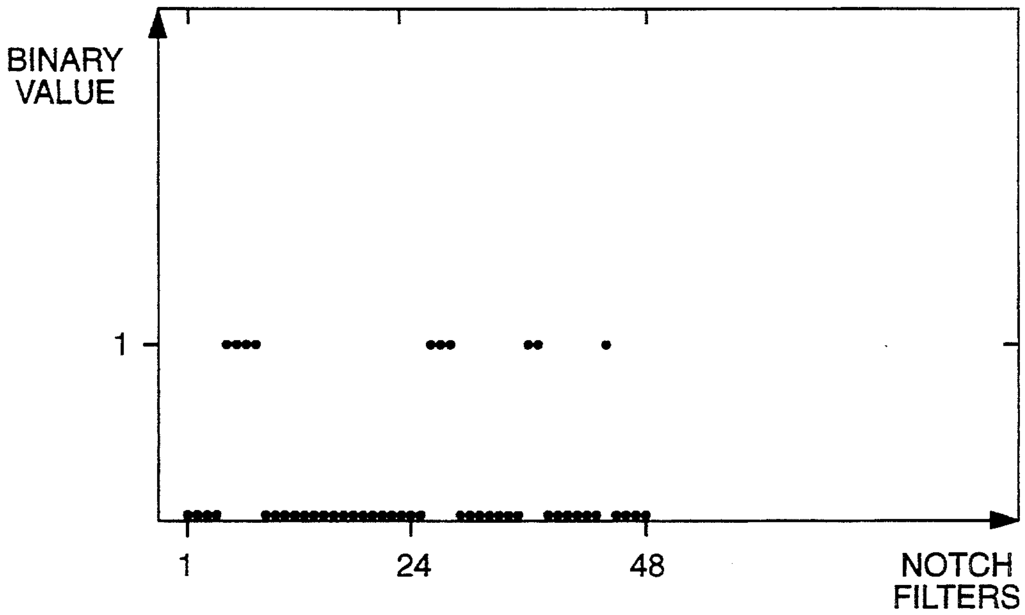
FIG. 8 is a the plot of the data of FIG. 7 after all points above the threshold of significance value are set to 1 and all points below the threshold of significance value are set to 0.

With reference to FIGS. 6 and 7, the comparator 134 of FIG. 3 determines the threshold of significance 210 in FIG. 7. The comparator 134 of FIG. 3 assigns 1's to notch filter outputs above the threshold of significance 210 and assigning 0's to notch filter outputs below the threshold of significance 210. FIG. 8 shows the output of the comparator 134, and FIG. 9 shows the placement of the output of the comparator into activity matrix A[i,n] 185.

Figure 4:
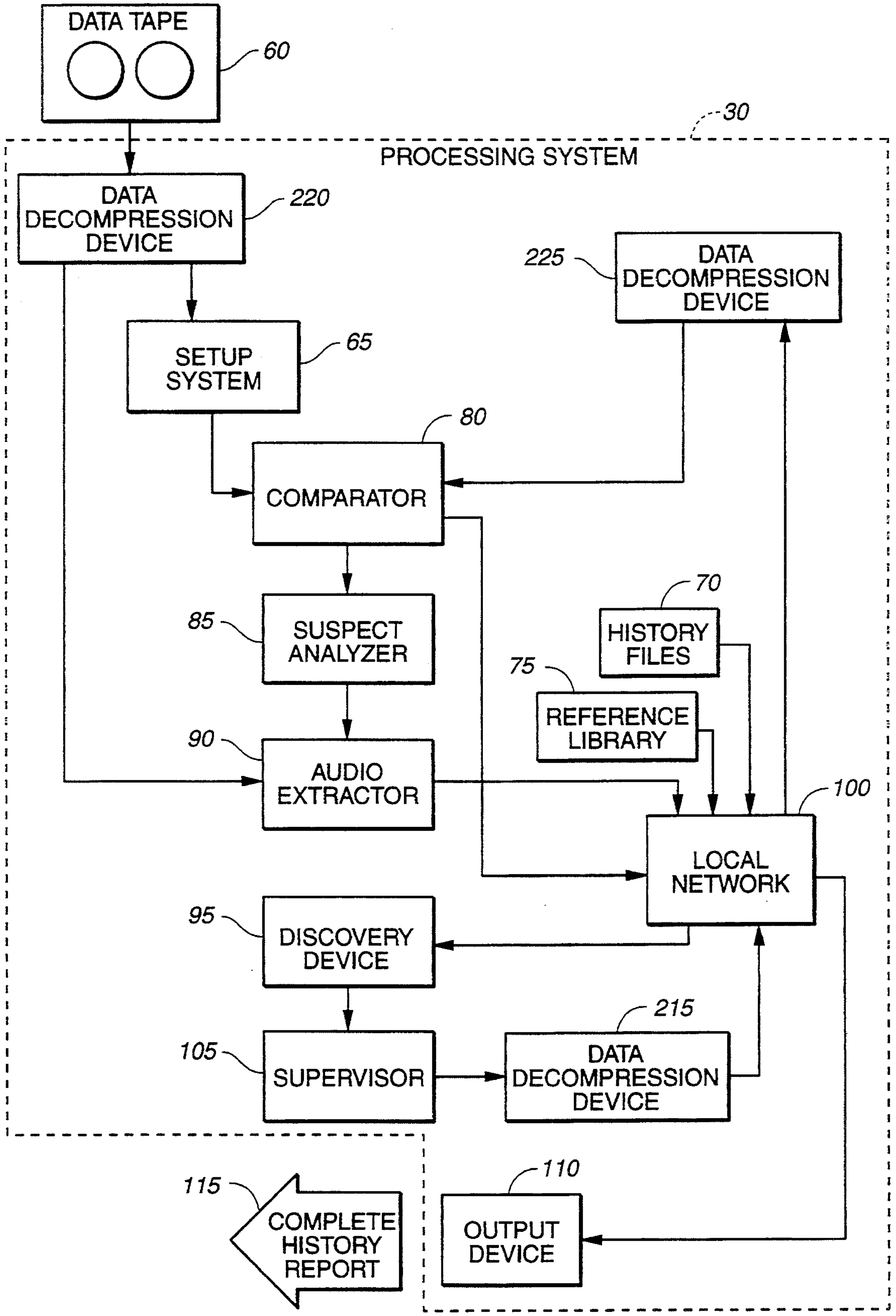
FIG. 4 is a block diagram depicting an alternative embodiment of the recognition system.

The activity matrix A[i,n] 185 forms the basis for all recognition operations. Recognition operations can be performed either real-time, i.e., as the activity matrix input is being generated from the audio input, or the activity matrix input can be recorded for later recognition operations using data tape 60, as described above. In either case the activity matrix A[i,n] 185 may be converted into a packed number sequence in order to conserve memory space. An embodiment of the present invention where the activity matrix A[i,n] 185 is converted into a packed number sequence before storage is depicted in FIG. 4. The embodiment is similar to the embodiment of FIG. 1 except for the additional data compression device 215 and data decompression devices 220 and 225. In this embodiment, data storage device 196 of FIG. 2 serves as a data compression device. The compression of activity matrices into packed number sequences is described below.

Recall that activity matrix A[i,n] 185 has 48 rows and an indefinite number of columns, depending on how long the audio is monitored. Since each column represents 1 tick and there are 50 ticks per second, the activity matrix input for 15 seconds of audio has 48 rows and 750 columns. Let Aj[i,m] be the 48×750 matrix representing the j-th 15-second portion of the activity matrix input. This matrix is represented by the sequence of numbers $$\{N0,n[1], \ldots, n[N0],p[0],p[1], \ldots ,p[M]\} \quad \text{Eq. 6}$$

where N0 is the number of semitones that are active at the first tick (m=1) covered by the matrix Aj[i,m] and n[k] is a list of the N0 active semitones. For example, if semitones 2, 3, 10, and 40 are active at tick 1, then N0=4, n[1]=2, n[2]=3, n[3]=10, and n[4]=40. The p[k] values represent the lengths of time, in ticks, that each semitone is in active and inactive states, with p[0] beginning the description of the activity for semitone 1 and p[M] ending the description of the activity of semitone 48.

To illustrate, consider the example just cited where semitones 2, 3, 10 and 40 are the only active semitones at tick 1. In this case p[0] is the total time in ticks that semitone 1 remains in its initial inactive state. If semitone 1 is inactive for the entire 750-tick period, p[0]=750. If it becomes active during any part of this period, p[0] is the number of ticks before it first becomes active and p[1] is the number of ticks that it is active during its first active state. If it is active for the duration of the 750 tick period, then p[0]+p[1]=750. Otherwise, p[2] is the number of ticks that it is inactive following its p[1] period of active status. If it remains inactive for the duration of the 750 tick interval, then p[0]+p[1]+p[2]=750. Following this logic one can extract from the first p[k] values the values of the activity matrix Aj[i,m] along row 1 for the entire 750 columns. If the sum of the first k values of p[k] is 750, then p[k+1] begins the description of the activity of semitone 2. In this case p[k+1] is the length of time that semitone 2 is initially active. If it is active for the entire 750 tick period, p[k+1]=750. Otherwise, p[k+2] is the number of ticks that semitone 2 is inactive following its initial p[k+1] period of active status. Following the same procedure as that employed for semitone 1, the second row of the activity matrix Aj[i,m] can be completed. If the sum of the first L values of p[k] is 1500, then p[L+1] begins the description of the third row of Aj[i,m]; and similarly the complete description of the activity matrix from the number sequence can be obtained.

In the preferred embodiment, all of the activity matrix input and the reference activity matrices are stored in this format, i.e., blocks of numbers each of which represents a 15-second time interval. This particular format is amenable to dense storage because the vast majority of the p[k] values are smaller than 256 and can be stored as bytes. Values larger than 256 require 2 bytes. On average the storage requirement is 60 bytes per second of audio. By contrast, an audio CD contains roughly 85000 bytes per second.

The recognition operation of the monitoring system 20 will now be described. The output of the recording operation is the activity matrix input, which takes the form of an activity matrix A[i,n] 185. The activity matrix A[i,n] 185 forms the basis of all recognition analysis. Recognition analysis is the process of identifying a given signal within another signal. For example, to determine whether a particular song was broadcast by a particular radio station it is necessary to determine whether the signal that constitutes the song is contained within the signal that constitutes the broadcast.

In the monitoring system 20 all audio signals are transformed into the activity matrix A[i,n] 185 form. Thus, let R[i,m] be the activity matrix generated by the monitoring system 20 when its audio input is the signal that is to be identified or recognized. This is the essence of the teaching mode of the monitoring system 20, namely feed it the audio signal to be identified and collect the activity matrix R[i,m], i=1,2, . . . , 48; m=1, . . . M that it produces. Here, M is the time span of the signal in ticks. The R[i,m] matrix is stored in a reference library of reference activity matrices representing audio items (music, commercials, pre-recorded speech, etc.)

that the monitoring system 20 is to recognize. In other words, the reference library contains a set of K reference activity matrices, $$Rk[i,m]; k=1, \ldots, K; i=1, \ldots, 48; m=1, \ldots, Mk. \qquad \text{Eq. 7}$$

each of which is a monitoring system 20 transformed audio signal that is to be recognized.

Let A[i,n] 85 be the activity matrix input produced by the monitoring system 20 from the audio signal from a given source (a radio station, for example), and suppose that it is desired to determine whether any of the K reference activity matrices represented in the reference library are present in the audio signal from that source. Intuitively, one would say that item k is present in the given activity matrix input if there exists some tick, say tick q, in A[i,n] such that the elements of Rk[i,m] match those of A[i,n] when column i of Rk[i,m] is overlaid on column q of A[i,n], column 2 of Rk[i,m] is overlaid on (q+1) of A[i,n], and so on for all Mk columns of Rk[i,m]. Under ideal conditions each element of Rk[i,m] would equal the corresponding element of A[i,n] if the activity matrix input consisted of item k beginning at tick q. Idealized conditions do not generally occur in the real world, however, so there must be some measure of equality, or degree of match, to use as a basis for deciding when a given audio item is present.

Two causes of non-ideal conditions are frequency/amplitude distortions, induced as noise by hardware or deliberately introduced by broadcasters to achieve a particular sound, and speed differences between the playback device used to generate the reference activity matrices and that used by the broadcaster of the audio signal from which the activity matrix input is formed. Frequency distortions cause changes in the relative amplitudes of the harmonic components of the audio signal. The sensitivity of the monitoring system 20 to this type of alteration in the audio signal is inherently limited by the nature of the activity matrix, which enumerates the set of significant harmonics rather than their absolute amplitudes. Therefore, the monitoring system 20 is insensitive to frequency distortions that do not radically alter the set of significant harmonies.

Playback speed differences produce two effects—they shift the frequency spectrum either up or down by a constant amount, and they cause a change in the rate at which events in the audio signal occur. A speed difference of about 5 percent between that of the reference activity matrices and that of the monitored audio signal would cause a difference in pitch of about one semitone, and hence it would be detectable to the ear. For this reason deliberate speed changes are generally confined to levels below 5 percent. The monitoring system 20 can compensate for pitch changes by displacing the reference activity matrix Rk[i,m] up or down by one row with respect to the input audio signal's activity matrix A[i,n] and computing the degree of match at each of the displaced locations.

To compensate for the event timing changes, the monitoring system 20 divides the reference activity matrix Rk[i,m] into sub-matrices each of which covers 3 seconds of the reference activity matrix. Each submatrix is then compared to the activity matrix A[i,n] and a composite match score (discussed below) is computed. To illustrate, suppose that item k in the reference library is in fact present in the activity matrix input beginning at tick q, but that the item k is being played back 3 percent faster than the playback speed used to make the reference activity matrix Rk[i,m]. In this case column i of Rk[i,m] should match column q of A[i,n] but column 100 of Rk[i,m] should match column 97 of A[i,n] since the audio signal represented by A[i,n] is running 3 percent faster. If the first sub-matrix of Rk[i,m] contained the first 100 columns of the reference activity matrix, then this sub-matrix would have its highest match score when it is superimposed on A[i,n] beginning at column q of A[i,n]. Similarly, the next 100-column submatrix of Rk[i,m] would have its largest match score when superimposed on A[i,n] beginning at column 98 of A[i,n], etc. A composite match score is defined as the sum of the best match scores of each of the sub-matrices where each submatrix has been compared with A[i,n] within only a narrow window of columns determined by the position of the best match submatrix one. For example, if submatrix one has its best match at column n=100 of A[i,n], then submatrix two is compared with A[i,n] over the window n=240 to n=260 (recall that each submatrix is 150 ticks (columns) wide); submatrix three is compared in the window 20 columns wide centered 150 columns from the point of best match of submatrix one; etc. The composite score is the basis for deciding whether item k is present in A[i,n].

The degree of match between a reference activity matrix Rk[i,m] and an activity matrix A[i,n] beginning at column n=q of A[i,n] is called a match score and is defined as $$Ek(q)=2*i/(r+a) \qquad \text{Eq. 8}$$

where r is the sum of all elements of Rk[i,m] (recall that the elements are binary); a is the sum of all elements of A[i,n] that are overlaid by elements of Rk[i,m]; and i is the sum of the product of the elements of Rk[i,m] and A[i,n] that overlay each other. In all cases the sum is taken over all 48 rows of each matrix and over the Mk columns of Rk[i,m] and Mk columns of A[i,n] which are overlaid by Rk[i,m]. Note that if just the elements of Rk[i,m] and A[i,n] which are 1's are considered, then (r+a) is the union of the two sets, and i is the intersection. In the case of a perfect match of Rk[i,m] and A[i,n] the match score E=1; and in the case of complete mismatch, E=0.

Computing the match score defined by Eq. 8 is a computationally intensive operation that must be performed on each sub-matrix component of Rk[i,m], as discussed above, at frequent tick intervals along A[i,n]. Consequently, if the amount of computer time allotted to the recognition operation is restricted, the total number K of reference activity matrices that can be processed is limited. One way to enlarge the number of reference activity matrices that can be handled in a given amount of computer time is to define a set of macro properties of an activity matrix that allows reference activity matrices and activity matrix input to be categorized into smaller subgroups. As an illustration, consider the problem of trying to match a photo of a person with one of a large number of photos in a mug file. In this case appropriate macro properties would include race, sex, eye color, facial hair, etc. To match the photo of a white male with brown eyes and no beard, it would be sufficient to compare the photo with only the subset of photos in the file having these characteristics.

Finding meaningful macro properties of the activity matrix is not as straightforward as categorizing people, but applicants have found through empirical studies that the following three attributes yield good results: tempo frequency distribution, musical key distribution, and semitone duty cycle. These properties are quantified in the form of a 72-element vector referred to as a macro vector. The steps involved in the computation of the macro vector are described below.

Before presenting the details of these calculations it is perhaps worthwhile to elaborate on the conceptual meaning of the macro vector and the way in which it is used in the recognition operation. First, keep in mind that the macro vector is a quantitative property of a given set of columns of an activity matrix. It is applicable to reference activity matrices as well as to activity matrix input. Recall that the activity matrix has 48 rows and one column for each tick. For example, the activity matrix corresponding to 30 seconds of audio, be it a reference activity matrix or a portion of activity matrix input, has 48 rows and 1500 columns. A macro vector can be computed for any subset of these 1500 columns. For example, the macro vector for columns 1 through 500, or 10 through 100, or the entire 1500 columns can be calculated. In any event, the macro vector ends up characterizing the audio over a given interval of time because the columns of the activity matrix represent the state of the audio at different instants of time. To make this explicit in mathematical terms a macro vector that describes an interval of L ticks (and L columns) beginning at tick m is denoted by $$V(m,L)=[v1, v2, v3, \ldots, v72] \qquad \text{Eq. 9}$$

It is important to note that L is essentially an averaging interval because V(m,L) is a composite measure or average of conditions within this interval, and that the macro vector V(m,L) is a function of time, inasmuch as it can be computed for any arbitrary tick m.

In the present embodiment of the monitoring system 20 L=500 ticks is used as the standard interval and V(m,L) is computed at regular intervals of time along the activity matrix input. That is, V(m,L) is computed at ticks m1, m2, m3, . . . where (m2−m1)=(m3−m2)= . . . =60. Since in this case the averaging interval L (=500 ticks) is larger than the time interval of 60 ticks at which the macro vectors are computed, the set of vectors V(m1,L), V(m2,L), etc. represent averages over overlapping intervals of time. For example, if m1=1, m2=61, m3=121, etc. then V(1;500) represents an average over ticks I through 500; V(61;500) is an average over ticks 61 through 561; etc., so that each succeeding macro vector covers a part of the time covered by the preceding macro vector. When, as in this case, the averaging interval L is much larger than the tick interval at which the macro vectors are extracted, differences between successive macro vectors tend to be small.

The difference between any two 72-element macro vectors X and Y is defined as $$|X-Y|=\{(x1-y1)^{}2+(x2-y2)^{}2+\ldots+(x72-y72)^{}2\}^{}(\tfrac{1}{2}) \qquad \text{Eq. 10}$$

Here the notation (x−y)2 means the quantity x−y squared, and {}(½) means the square root of the quantity inside the brackets. It is mathematically convenient to work with normalized vectors, i.e., vectors whose length is one unit of length in the chosen space. The length of the vector V(m,L) is defined as $$|VM|=\{(v1)^{}2+(v2)^{}2+\ldots+(v72)^{}2\}^{}(\tfrac{1}{2}). \qquad \text{Eq. 11}$$

Any vector can be made to have unit length, i.e., can be normalized, by dividing each of its elements by its unnormalized length. The normalized vector of V(m,L) is denoted by V′(m,L) so that:

$$V'(m,L)=[v1/d, v2/d, \ldots, v72/d] \qquad \text{Eq. 12}$$

where d=|V| as defined above.

A set of normalized vectors can be visualized as a set of points on the surface of a sphere of unit radius centered at the origin of the vector space. If the vectors have more than 3 elements, the vector space has more than 3 dimensions and the vector space is called a hyperspace. Since it is impossible to visualize lines and surfaces in a hyperspace, one must resort to a 3-dimensional analogy for help. In this light one can visualize a set of macro vectors computed from an ongoing activity matrix input at ticks m1, m2, m3, . . . as points on the surface of a 3-dimensional sphere of unit radius. Notice that since the macro vectors all have the same length, they can differ only in their directions. As pointed out earlier, in the case where the averaging interval L is much-larger than the difference between the macro vector calculation times (m2−m1, for example), differences between successive vectors V′(m1,L), V′(m2,L), etc. tend to be small. Stated another way, the points on the sphere represented by successive macro vectors are relatively close together.

Consider an activity matrix input generated from an input audio signal and consider the set of points represented by the macro vectors computed at regular intervals of 60 ticks along the entire length of the activity matrix input. If one were to draw line segments along the surface of the sphere connecting each successive macro vector point, one would end up with a path, or trajectory, on the sphere representing the temporal evolution of the input audio's macro properties (tempo frequency distribution, musical key distribution, and semitone duty cycle). Consider in this same context a set of reference activity matrices Rk[i,m], each having a corresponding set of macro vectors V′k(m,L). One can visualize the total set of macro vectors plotted as points over the surface of the sphere. Under ideal conditions, if an audio item represented by reference activity matrix Rk[i,m] in the reference library is an item that occurs in the activity matrix input, then the trajectory described above associated with that audio item will pass through the point V′k(k,L) on the sphere.

It has already been pointed out that ideal conditions do not occur in practice, meaning that the audio trajectory generally does not coincide exactly with a macro vector of a matching reference activity matrix item. This is not a problem, however, because the macro vectors are not used as the indicator of a match between a reference activity matrix in the reference library and the activity matrix input. Rather the macro vectors are used as a guide for selecting a subset of the reference activity matrices on which to perform the detailed matrix matching described above in Eq. 8. It is the result of the Eq. 8 match operation that forms the basis for the recognition decision.

At each of the ticks m1, m2, etc. that the macro vector of the activity matrix input is extracted, the Eq. 8 matching operation is performed on all reference activity matrices whose macro vector points are within a given distance of the macro vector extracted from the activity matrix input. To illustrate, imagine that the recognition operation has been in progress and that a trajectory of points has been established connecting the macro vectors extracted from the activity matrix input at each of the former time ticks m1, m2, etc. The trajectory begins at the time that the recognition operation began and it ends at the present instant of the analysis. The next macro vector V(m,L) is now extracted from the activity matrix input and it forms the next point of the trajectory. Using this new point as the center, a circle is drawn of a given radius on the macro vector sphere. All reference activity matrices in the reference library whose macro vectors V'k(m,L) lie within that circle are selected for performing the detailed matrix matching operation defined by Eq. 8.

The radius of the circle is optional, but if it is made too large, the resulting number of reference activity matrices that must be examined in detail will be too large which is the situation that is to be avoided. If the radius is made too small, items that actually occur in the input audio may be missed because they were not examined. Thus, it is desired to adjust the radius so that the subset of items to be examined using Eq. 8 is as large as the computer time will allow. Applicants have found in empirical tests that recognition rates higher than 99% can be achieved with a radius small enough to allow less than 1% of the items in the reference library to fall within the circle. In summary, the macro vector is an artifice for reducing the amount of computer time necessary to match reference activity matrices with the activity matrix input.

We turn now to a description of the way in which the elements of the macro vector are computed in the preferred embodiment. Recall that three audio characteristics are embodied in the macro vector: tempo frequency distribution; musical key distribution; and semitone duty cycle. In the preferred embodiment, each of these is allotted 24 elements of the 72-element macro vector. Keeping in mind that the macro vector V(m,L) is a description of a 48-row-by L-column portion of an activity matrix, consider first the tempo frequency distribution part of the macro vector.

Each of the 48 rows in the part of the activity matrix from which the macro vector V(m,L) is to be computed contains L (nominally 500) binary values. Each binary value signifies whether the semitone represented by the chosen row was active (indicated by a 1) or inactive (indicated by a 0) at the time of the tick represented by the column in which the chosen binary value resides. A typical row of values along one row of an activity matrix is shown below.

```
. . . 0000111111111110000000000011111 . . .
       ||         ||
end of   ——>||<—— 1 pulse ——>||<—— begin next
previous    (pulse period = 21 ticks;     pulse
pulse        pulse duty cycle = 10/21)
```

The values shown represent the temporal changes in the activity of a single semitone. A period of activity, represented by a string of 1's, followed by a period of inactivity, represented by an ensuing string of 0's, is called a pulse. The period of a pulse is defined as the total number of ticks that it spans. The duty cycle of a pulse is the ratio of its active time to its period.

The tempo frequency distribution is simply the distribution of pulse periods in the L column part of the activity matrix in which the macro vector is defined. It is obtained by collecting the periods of all pulses in all 48 rows over all L columns. Pulse fragments at the beginning and end of the L column interval, such as those illustrated in the exemplary row of values above, are ignored. The total number of pulses is a variable that reflects the nature of the audio. For example, semitones that are not active during any part of the L tick interval contain no pulses, and semitones carrying the rhythm of a fast song may contain 20 pulses. Once the periods of all the pulses have been determined, those associated with tempos faster than say 200 per minute and slower than say 10 per minute are discarded. This truncation process is performed to achieve better resolution of the middle portion of the tempo frequency distribution.

The range of values that is left after the high and low ends of the distribution have been truncated is partitioned into 24 intervals. Recall that the tempo frequency distribution part of the macro vector is allotted 24 of the 72 vector elements. The number of periods falling in each of these intervals becomes the value of the corresponding element of the (unnormalized) macro vector. That is, the number of pulses having the longest periods (slowest tempo) becomes element 0 of the macro vector; the number of pulses having the next smallest periods becomes element 1, etc. In this manner the first 24 elements of the macro vector are obtained. The first 24 elements are then normalized by applying the normalization process described above. Upon completion, values are obtained in the first 24 elements of the macro vector.

The musical key description occupies the next 24 elements. The first element of this part of the macro vector is simply the sum of all the 1's in the first 2 rows of the 48 row by L column portion of the activity matrix. The second element is the sum of the 1's in rows 3 and 4; and the twenty-fourth element, which is element 48 of the macro vector, is the sum of the 1's in rows 47 and 48 of the activity matrix. These 24 vector elements are subsequently normalized leaving interim values for the first 48 elements of the macro vector. Reference to this part of the macro vector as the musical key distribution is made loosely inasmuch as the rule just described for computing the elements does not comply strictly with the musical definition of key. The resulting vector, however, describes the spectral distribution of the sound, and in this sense it is an analogue of the key.

Continuing with the preferred embodiment, the final 24 elements of the macro vector describe the distribution of pulse duty cycles across the audio spectrum. These 24 elements are computed in much the same way as the musical key distribution description is computed, except in this case the total number of 1's in each pair of adjacent rows are added and divided by the corresponding number of pulses, as defined above, for the 2 rows. The resulting ratio becomes the unnormalized vector element. After all 24 values have been determined the resulting set is normalized as before.

After all three of the above operations have been performed, values for all of the macro vector's 72 elements are obtained. The vector is normalized to arrive finally at the macro vector description of the specified L columns of the activity matrix.

Other modifications of the present invention will readily be apparent to those of ordinary skill in the art from the teachings presented in the foregoing description and drawings. It is therefore to be understood that this invention is not to be limited thereto and that said modifications are intended to be included within the scope of the appended claims.

We claim:

1. A method for recognizing broadcast information comprising the following steps:

receiving a set of broadcast information;

converting said set of broadcast information into a set of digital values representing the magnitude of said broadcast information in different frequency intervals and at different broadcast times;

determining a set of threshold values, one for each member of said set of digital values, said threshold value being a function of selected members of said digital values;

forming an activity matrix composed of single-bit elements, each of said elements corresponding to each of said members of said set of digital values, the value of each element in said activity matrix being determined from a comparison of the magnitude and associated threshold of each member of said set of digital values;

generating a set of data macro vectors from said activity matrix, said set of data macro vectors containing condensed information relating to said set of activity matrices;

retrieving a set of reference matrices composed of single-bit elements from a storage device, each member of said set of reference matrices corresponding to a member of a set of previously identified information and having dimension corresponding in size to the dimension of at least one member of said set of activity matrices;

generating a set of reference macro vectors from said set of reference matrices, said set of reference macro vectors containing condensed information relating to said set of reference matrices retrieved from said storage device;

comparing said set of data macro vectors with said set of reference macro vectors;

selecting a set of macro vectors from said set of reference macro vectors, each member in said set of selected macro vectors being within a predetermined distance to a corresponding member in said set of data macro vectors;

comparing a selected set of reference matrices to said set of activity matrices, the members of said selected set of reference matrices corresponding to the members of said set of selected macro vectors; and determining, based on the comparison of said selected sets of reference and activity matrices, whether members of said set of broadcast information correspond to any member of said set of previously identified information.

2. The method of claim 1 wherein the step of comparing macro vectors includes the following steps: normalizing said set of data macro vectors to a predetermined length;

normalizing said set of reference macro vectors to said predetermined length of said set of data macro vectors; and comparing the direction of said set of normalized data macro vectors with said set of normalized reference macro vectors.

3. The method of claim 1 further comprising the steps of:

converting said activity matrix into a packed number sequence amendable to mass storage; and storing said packed number sequence.

4. The method of claim 3, wherein the step of comparing said data and reference matrices includes the following steps:

retrieving said packed number sequence; and converting said packed number sequence back to said set of activity matrices.

5. A method for recognizing broadcast information, comprising the following steps:

receiving broadcast information;

generating a set of single-bit activity values representative of said received broadcast information, each member of said set of activity values representing a non-overlapping time interval of said broadcast information;

retrieving a set of single-bit reference values from a storage device, each member of said set of reference values corresponding to a member of a set of previously identified information;

dividing said set of activity values into a set of recognized values and a set of unrecognized values, said set of recognized values being the portion of said set of activity values which is similar to at least one member of said set of reference values;

selecting suspect members from said set of unrecognized values, the activity value of each suspect member being similar to the activity value of at least one other member within said set of unrecognized values;

playing said recorded broadcast information which corresponds to said suspect members in the presence of a human operator; and determining, based on the playing of the said recorded broadcast information, whether individual suspect member should be added to said set of reference values.

6. The method of claim 5 wherein said step of selecting comprises:

dividing the time interval corresponding to a first member of said set of unrecognized values into a first set of non-overlapping time segments;

generating a first set of suspect values, each member of said first set of suspect values representing said received broadcast information during a distinct one of said first set of time segments;

dividing the time interval corresponding to a second member of the set of unrecognized values into a second set of non-overlapping time segments;

generating a second set of suspect values, each member of said second set of suspect values representing said received broadcast information during a distinct one of said second set of time segments; and identifying said first member as one of said suspect members if said first set of suspect values is similar to said second set of suspect values.

7. The method of claim 5 wherein said set of activity values comprises a set of activity matrices and said set of reference values comprises a set of reference matrices, and wherein said step of dividing comprises the steps of:

generating a set of data macro vectors which condenses information contained in said set of activity matrices;

generating a set of reference macro vectors which condenses information contained in said set of reference matrices;

selecting a set of macro vectors from said set of data macro vectors, each member in said set of selected macro vectors being within a predetermined distance to members in said set of reference macro vectors;

comparing a selected set of activity matrices to said set of reference matrices, the members of said selected set of activity matrices corresponding to the members of said set of selected macro vectors; and determining, based on the comparison of said selected set of activity matrices, whether individual members of said set of selected activity matrices belongs to said set of recognized values.

8. The method of 7 wherein each member of said set of activity macro vectors contains information relating to tempo frequency distribution, musical key distribution, and semitone duty cycle of said received broadcast information.

9. The method of recognizing broadcast information of claim 5 wherein said step of comparing matrices further includes the step of compensating for playback speed differences between said broadcast information and said previously identified information.

10. The method of 5 further comprising the step of generating a history file containing identification information for each member of said set of recognized values.

11. The method of 5 further comprising the step of adding to said history file the identification information of each suspect member which has been added to said set of reference values.

12. An apparatus for recognizing broadcast information comprising:

means for receiving broadcast information;

means for converting said received broadcast information into a set of digital values representing the magnitude of said broadcast information in different frequency intervals and at different broadcast times;

means for determining a set of threshold values, one for each member of said set of digital values, said threshold value being a function of selected members of said digital values;

means for forming an activity matrix composed of single-bit elements, each of said elements corresponding to each of said members of said set of digital values, the value of each element in said activity matrix being determined from a comparison of the magnitude and associated threshold of each member of said set of digital values;

means for generating a set of data macro vectors from said activity matrix, said set of data macro vectors containing condensed information relating to said set of activity matrices;

a storage device for storing a set of reference matrices composed of single-bit elements, each member of said set of reference matrices corresponding to a member of a set of previously identified information and having dimension corresponding in size to the dimension of at least one of said set of activity matrices;

means for retrieving said set of reference matrices;

means for generating a set of reference macro vectors from said set of reference matrices, said set of reference macro vectors containing condensed information relating to said set of reference matrices;

means for comparing said set of data macro vectors with said set of reference macro vectors;

means for selecting a set of macro vectors from said set of reference macro vectors, each member in said set of selected macro vectors being within a predetermined distance to a corresponding member in said set of data macro vectors;

means for comparing a selected set of reference matrices to said set of activity matrices, the members of said selected set of reference matrices corresponding to the members of said set of selected macro vectors; and means for determining, based on the comparison of said selected sets of reference and activity matrices, whether members of said set of broadcast information correspond to any member of said set of previously identified information.

13. The apparatus of claim 12 wherein said means for receiving broadcast information comprises a tuner.

14. An apparatus for recognizing broadcast information comprising:

means for receiving broadcast information;

means for generating a set of single-bit activity values representative of said received broadcast information, each member of said set of activity values representing a non-overlapping time interval of said broadcast information;

a storage device for storing a set of reference values;

means for retrieving said set of single-bit reference values from said storage device, each member of said set of reference values corresponding to a member of a set of previously identified information;

means for dividing said set of activity values into a set of recognized values and a set of unrecognized values, said set of recognized values being the portion of said set of activity values which is similar to at least one member of said set of reference values;

means for selecting suspect members from said set of unrecognized values, the activity value of each suspect member is similar to the activity value of at least one other member within said set of unrecognized values;

means for playing said recorded broadcast information which corresponds to said suspect members in the presence of a human operator; and means for determining, based on the playing of said recorded broadcast information, whether individual suspect member should be added to said set of reference values.

15. The apparatus of claim 14 wherein said means for selecting suspect members comprises:

means for dividing the time interval corresponding to a first member of said set of unrecognized values into a first set of non-overlapping time segments;

means for generating a first set of suspect values, each member of said first set of suspect values representing said received broadcast information during a distinct one of said first set of time segments;

means for dividing the time interval corresponding to a second member of the set of unrecognized values into a second set of non-overlapping time segments;

means for generating a second set of suspect values, each member of said second set of suspect values representing said received broadcast information during a distinct one of said second set of time segments; and means for identifying said first member as one of said suspect members if said first set of suspect values is similar to said second set of suspect values.

16. The apparatus of claim 14 further comprising means for generating a history file containing identification information for each member of said set of recognized values.

17. The apparatus of 14 further comprising means for adding to said history file the identification information of each suspect member which has been added to said set of reference values.

* * * * *